(12) United States Patent
Kinney et al.

(10) Patent No.: US 12,461,064 B2
(45) Date of Patent: Nov. 4, 2025

(54) MAGNETIC CONTROL OF MOLECULE TRANSLOCATION SPEED THROUGH A NANOPORE

(71) Applicant: Western Digital Technologies, Inc., San Jose, CA (US)

(72) Inventors: Justin P. Kinney, San Jose, CA (US); Daniel Bedau, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 249 days.

(21) Appl. No.: 18/364,506

(22) Filed: Aug. 3, 2023

(65) Prior Publication Data
US 2024/0426778 A1    Dec. 26, 2024

Related U.S. Application Data

(60) Provisional application No. 63/510,036, filed on Jun. 23, 2023.

(51) Int. Cl.
*G01N 27/447* (2006.01)
*C12Q 1/6869* (2018.01)

(52) U.S. Cl.
CPC ..... *G01N 27/44786* (2013.01); *C12Q 1/6869* (2013.01); *G01N 27/44791* (2013.01)

(58) Field of Classification Search
None
See application file for complete search history.

(56) References Cited

U.S. PATENT DOCUMENTS

| | | |
|---|---|---|
| 7,980,765 B2 | 7/2011 | Reitz et al. |
| 8,602,182 B2 | 12/2013 | Clair et al. |
| 10,676,782 B2 | 6/2020 | McRuer et al. |
| 10,995,373 B2 | 5/2021 | Predki et al. |
| 2006/0038328 A1 | 2/2006 | Lu et al. |
| 2006/0063171 A1 | 3/2006 | Akeson et al. |

(Continued)

FOREIGN PATENT DOCUMENTS

| | | |
|---|---|---|
| CN | 107764994 A | 3/2018 |
| CN | 115219558 A | 10/2022 |

(Continued)

OTHER PUBLICATIONS

Sang Yoon Park, et al., "A Solid State Nanopore Device for Investigating the Magnetic Properties of Magnetic Nanoparticles", Sensor, 13(6): p. 6900-6909, May 2013.*

(Continued)

*Primary Examiner* — J. Christopher Ball

(57) ABSTRACT

A system for controlling a translocation speed of a molecule through a nanopore may include a fluid chamber containing a solution with a magnetic susceptibility that is different from the magnetic susceptibility of the molecule, a nanopore situated in the fluid chamber, and at least one magnetic component configured to create a magnetic field gradient within the solution to control the translocation speed of a molecule through the nanopore. A system for controlling a translocation speed of a molecule through a nanopore may include a nanopore at least one magnetic component situated to create a magnetic field that causes the molecule to experience a rotational torque as it passes through the nanopore.

25 Claims, 11 Drawing Sheets

(56) References Cited

U.S. PATENT DOCUMENTS

| | | |
|---|---|---|
| 2008/0248561 A1 | 10/2008 | Golovchenko et al. |
| 2011/0053284 A1 | 3/2011 | Meller et al. |
| 2011/0155574 A1 | 6/2011 | Golovchenko et al. |
| 2011/0223652 A1 | 9/2011 | Peng et al. |
| 2011/0236984 A1 | 9/2011 | Sun et al. |
| 2012/0193235 A1 | 8/2012 | Afzali-Ardakani et al. |
| 2012/0258544 A1 | 10/2012 | Chen et al. |
| 2013/0176563 A1 | 7/2013 | Ozawa et al. |
| 2013/0344498 A1 | 12/2013 | Marziali et al. |
| 2018/0298436 A1 | 10/2018 | Lei et al. |
| 2019/0002971 A1 | 1/2019 | Koslover et al. |
| 2019/0096555 A1 | 3/2019 | Khalil et al. |
| 2020/0096493 A1 | 3/2020 | Roorda et al. |
| 2020/0191767 A1 | 6/2020 | Tabard-Cossa et al. |
| 2020/0292521 A1 | 9/2020 | Xie et al. |
| 2023/0176032 A1 | 6/2023 | Bedau et al. |
| 2023/0176033 A1 | 6/2023 | Bedau et al. |

FOREIGN PATENT DOCUMENTS

| | | |
|---|---|---|
| JP | 2018510329 A | 4/2018 |
| KR | 1020190104795 A | 9/2019 |
| KR | 1020200027034 A | 3/2020 |
| WO | 2011079217 A1 | 6/2011 |
| WO | 2012083233 A1 | 6/2012 |
| WO | 2017151680 A2 | 9/2017 |

OTHER PUBLICATIONS

"Developing nanopore technology for sequencing DNA in real time," Medical Science, Apr. 30, 2021.

A. Spaggiari, "Properties and applications of Magnetorheological fluids," Scilla 2012—The Italian research on smart materials and MEMS, 23 (2013) 57-61; DOI: 10.3221/IGF-ESIS.23.06.

Ángel Díaz Carral et al., "Deep learning for nanopore ionic current blockades," J. Chem. Phys. 154, 044111 (Jan. 2021); https://doi.org/10.1063/5.0037938.

Chan Cao and Yi-Tao Long, "Biological Nanopores: Confined Spaces for Electrochemical Single-Molecule Analysis," Acc. Chem. Res., Jan. 2018, 51, 331-341.

Chenyu Wen, "On Rectification of Ionic Current in Nanopores," Anal. Chem. Oct. 2019, 91, 14597-14604.

Farzin Haque et al., "Solid-State and Biological Nanopore for Real-Time Sensing of Single Chemical and Sequencing of DNA," Nano Today. Feb. 2013; 8(1): 56-74.

G. Bossis et al., "Magnetorheology: Fluids, Structures and Rheology," Springer-Verlag, Stefan Odenbach (Ed.): LNP 594, pp. 202-230, 2002.

Goto, Y., Akahori, R., Yanagi, I., & Takeda, K., "Solid-state nanopores towards single-molecule DNA sequencing," Journal of Human Genetics (Aug. 2019), doi:10.1038/s10038-019-0655-8.

International Search Report and Written Opinion from PCT App. No. PCT/US2022/030487 (filed May 23, 2022), mailed Nov. 7, 2022.

International Search Report and Written Opinion from PCT Application No. PCT/US2022/030484 (filed May 23, 2022), mailed Oct. 19, 2022.

James Sathya Kumar et al., "A review of challenges and solutions in the preparation and use of magnetorheological fluids," International Journal of Mechanical and Materials Engineering (2019) 14:13, https://doi.org/10.1186/s40712-019-0109-2.

Jeffrey Comer and Aleksei Aksimentiev, "DNA Sequence-Dependent Ionic Currents in Ultra-Small Solid-State Nanopores," Nanoscale. May 5, 2016; 8(18): 9600-9613. doi:10.1039/c6nr01061j.

K. Chen et al., "Nanopoare-Based DNA Hard Drives for Rewritable and Secure Data Storage," Nano Lett., Mar. 20, 2020, 3754-3760.

Ki-Ho Han and A. Bruno Frazier, "Paramagnetic capture mode magnetophoretic microseparator for high efficiency blood cell separations," Lab on a Chip, Issue 2, 2006.

Laura Conde-Canencia, Lara Dolecek, "Nanopore DNA sequencing channel modeling," IEEE International Workshop on Signal Processing Systems, Oct. 2019, Cape Town, South Africa.

Lee, H.H., Kalhor, R., Goela, N. et al. Terminator-free template-independent enzymatic DNA synthesis for digital information storage. Nat Commun 10, 2383 (Jun. 2019). https://doi.org/10.1038/s41467-019-10258-1.

Masateru Taniguchi, "Selective Multidetection Using Nanopores," Anal. Chem. 2015, 87, 188-199 (published Nov. 2014).

Mingyan Gao et al., "Self-Assembly of DNA Molecules in Magnetic Fields," available at https://uobrep.openrepository.com/bitstream/handle/10547/625343/8-Self-Assembly+of+DNA+Molecules+in+Magnetic+Fields.pdf?sequence=2 at least by Mar. 27, 2023.

Morii, N., Kido, G., Suzuki, H., Nimori, S. and Morii, H., 2004. "Molecular chain orientation of DNA films induced by both the magnetic field and the interfacial effect." Biomacromolecules, 5(6), pp. 2297-2307.

P. Berger et al., "Preparation and Properties of an Aqueous Ferrofluid," Journal of Chemical Education, vol. 76 No. 7 Jul. 1999.

Pramod K. Khulbe, et al., "DNA translocation through a-haemolysin nano-pores with potential application to macromolecular data storage," Journal of Applied Physics 97, 104317 pp. 1-7 (May 2005). doi: http://dx.doi.org/10.1063/1.1905791.

Qi Lu et al., "Smart and Functional Conducting Polymers: Application to Electrorheological Fluids," Molecules, Nov. 23, 2018, 2854; doi:10.3390/molecules23112854.

Rufan Zhang et al., "Growth of Half-Meter Long Carbon Nanotubes Based on Schulz Flory Distribution," CS Nano 2013, 7, 7, 6156-6161, Publication Date:Jun. 27, 2013.

S. Bin Mazlan, "The Behaviour ofmagnetorheological Fluids in Squeeze Mode," School of Mechanical and Manufacturing Engineering, Faculty of Engineering and Computing, Dublin City University, Aug. 2008.

Sally A. Peyman et al., "Diamagnetic repulsion—A versatile tool for label-free particle handling in microfluidic devices," Journal of Chromatography A, vol. 1216, Issue 52, Dec. 25, 2009, pp. 9055-9062.

Stijn van Dorp et al., "Origin of the electrophoretic force on DNA in solid-state nanopores," Nature Physics, vol. 5, May 2009.

Victor Zhirnov et al., "Nucleic acid memory," Nature Materials, vol. 15, Apr. 2016.

Wang, Ceming et al., "Slowing down DNA translocation through solid-state nanopores by edge-fieldleakage", Nature Communications, Jan. 8, 2021 (Online publication date), vol. 12, Article No. 140, Internalpp. 1-10.

Winkleman, A., Perez-Castillejos, R., Gudiksen, K.L., Phillips, S.T., Prentiss, M. and Whitesides, G.M., 2007. Density-based diamagnetic separation: devices for detecting binding events and for collecting unlabeled diamagnetic particles in paramagnetic solutions. Analytical chemistry, 79(17), pp. 6542-6550.

Yi, J., 2006. Emergent paramagnetism of DNA molecules. Physical Review B, 74(21), p. 212406.

Ying, YL., Hu, ZL., Zhang, S. et al. Nanopore-based technologies beyond DNA sequencing. Nat. Nanotechnol. 17, 1136-1146 (2022).

Yoshida, K., Ozawa, S., Yamamoto, I., Yamaguchi, M., Ogawa, K. and Takamasu, T., 2007. DNA electrophoresis under the gradient magnetic field. physica status solidi (a), 204(12), pp. 3918-3921.

Yu Zhen Dong et al., "Recent development of electro-responsive smart electrorheological fluids," Soft Matter, Apr. 2019, 15, 3473-3486.

Yuhui He et al., "Solid-state nanopore systems: from materials to applications," NPG Asia Materials, 13, 48 (Jun. 2021), https://doi.org/10.1038/s41427-021-00313-z.

Z. W. Pan et al., "Very long carbon nanotubes," Nature, vol. 394, Aug. 13, 1998.

International Search Report and Written Opinion from PCT Application No. PCT/US2024/012179 (filed Jan. 19, 2024), mailed May 17, 2024.

D. Wang, et al., "A Magnetic Gated Nanofluidic Based on the Integration of Superhydrophilic Nanochannels and a ReconfigurableFerrofluid", Advanced Materials, 31(7): 1805953, 7 pages, Feb. 2019.

* cited by examiner

MAGNETIC CONTROL OF MOLECULE TRANSLOCATION SPEED THROUGH A NANOPORE

CROSS-REFERENCE TO RELATED APPLICATIONS

This application claims the benefit of, and hereby incorporates by reference in its entirety for all purposes, U.S. provisional application No. 63/510,036, filed Jun. 23, 2023 and entitled "MAGNETIC CONTROL OF MOLECULE TRANSLOCATION SPEED THROUGH A NANOPORE".

BACKGROUND

Nucleic acids are negatively-charged polyelectrolytes with four monomers that are covalently bonded to form polymer chains. For deoxyribonucleic acid (DNA), the monomers are the nucleotides adenine (A), thymine (T), guanine (G), and cytosine (C). For ribonucleic acid (RNA), they are A, C, G, and uracil (U).

The use of biomolecules, including DNA, RNA, and proteins, to store data has been proposed due to the density, stability, energy-efficiency, and longevity of biomolecules. For example, the DNA in a human cell has a mass of about 3 picograms and stores around 6.4 GB of information. The volumetric density of DNA is estimated to be 1,000 times greater than that of flash memory, and its energy consumption 108 times less than that of flash memory. In addition, the retention time of DNA is significantly greater than that of electronic memory. Thus, DNA can store information reliably over time.

Information bits can be encoded into biomolecules, such as nucleic acid strands, using a variety of techniques. Once encoded, the biomolecules can later be read using a structure called a nanopore, which is a small hole, typically 1-2 nm in diameter and a couple of nanometers thick.

There are two types of nanopore: biological (also referred to as protein) nanopores and solid-state nanopores. A biological nanopore is made from a pore material embedded in a lipid membrane. A solid-state nanopore is a nanoscale (e.g., nanometer-sized) opening in a synthetic membrane (e.g., SiNx, $SiO_2$, etc.).

A target biomolecule, such as a nucleic acid strand, in an electrolyte solution can be driven through a nanopore (biological or solid-state), primarily by electrophoresis, and read. A highly-focused external electric field applied transverse to and in the vicinity of the nanopore (e.g., by sensing electrodes used to read or detect the biomolecule) acts on a relatively short segment of the negatively charged biomolecule and directs it through the hole in the nanopore.

The electrolyte solution is a liquid that contains dissolved ions, typically salts that provide electrical conductivity, which allows for the flow of electric current through the nanopore. The electrolyte solution may be, for example, a buffered salt solution (e.g., buffered saline (PBS), Tris-buffered saline (TBS), or HEPES-buffered saline) or an ionic liquid (e.g., an organic salt that exists in a liquid state at room temperature).

As a molecule passes through a nanopore, the ions occupying the pore are excluded, which causes changes in the ionic current and/or electronic signal measured across the nanopore (e.g., using sensing electrodes on opposite sides of the nanopore). These changes in the ionic current and/or the electronic signal can be observed and used to detect constituent parts of the biomolecule (e.g., nucleotides of a DNA strand). For example, as nucleic acid moves, or translocates, through the nanopore, different nucleotides cause different ionic current patterns. Specifically, the nucleotides cause distinct, measurable ionic current blockades, or current drops, as they pass through the nanopore. The current blockades can be recorded (e.g., using a current amplifier) and converted into digital signals (e.g., using an analog-to-digital converter). These current blockades, or patterns of them, can be used to distinguish between different nucleotides. For example, by analyzing the amplitudes, durations, frequencies, and/or shapes of the blockade events, various properties of the target molecule can be obtained.

The duration of each current blockade is dependent on the translocation or dwell time of the biomolecule passing through the nanopore. One challenge with using nanopores is that there is a trade-off between signal-to-noise ratio (SNR) and resolution. Specifically, at the voltages that provide adequate SNR for reading the biomolecule, the translocation speed of biomolecules due to electrophoresis is too high (and the dwell time too low) to provide the highest resolution desired. For example, when the biomolecule is ssDNA, at sufficient SNR for reading, the translocation speed is too high to allow changes in the ionic current due to single nucleotides to be resolved. Each nucleotide of ssDNA spends only on the order of 1 us or less within the nanopore at the voltages used. In order to detect individual nucleotides, a high sampling rate is needed, which amplifies thermal noise and reduces the SNR. The dwell time per nucleotide should be on the order of between 100 us and 1 ms to allow single-nucleotide resolution.

A number of approaches have been proposed to control the translocation speed of biomolecules through a nanopore. For example, one approach is to reduce the bias voltage provided to the sensing electrodes to decrease the translocation speed. The result, however, is that decreasing the bias voltage decreases the sensed magnitude of the ionic current relative to thermal noise. Therefore, the SNR decreases. Reducing the bias voltage can also reduce throughput by reducing the rate at which biomolecules are drawn into the nanopore.

Other approaches proposed or attempted to reduce the translocation speed of molecules through a nanopore include modifying the properties of the electrolyte containing the molecules (e.g., adding salt, reducing the temperature, or using glycerol rather than water), using traps or tweezers, or using protein tags. If successful, these methods are expected to result in only modest reductions in the translocation speed.

Accordingly, there is a need for apparatuses and techniques that can control and/or reduce the translocation speeds of molecules through nanopores.

SUMMARY

This summary represents non-limiting embodiments of the disclosure.

In some aspects, the techniques described herein relate to a system for controlling a translocation speed of a molecule through a nanopore, the system including: a fluid chamber containing a solution having a magnetic susceptibility that is different from a magnetic susceptibility of the molecule; the nanopore situated in the fluid chamber; and at least one magnetic component configured to create a magnetic field gradient within the fluid chamber to control the translocation speed of the molecule through the nanopore.

In some aspects, the techniques described herein relate to a system, wherein the solution is a paramagnetic solution.

In some aspects, the techniques described herein relate to a system, wherein the molecule is paramagnetic.

In some aspects, the at least one magnetic component includes: a first magnetic component situated on a first side of the nanopore, the first magnetic component having a first north pole and a first south pole; and a second magnetic component situated on a second side of the nanopore, the second magnetic component having a second north pole and a second south pole; wherein: (a) the first north pole is closer to the nanopore than the first south pole, and the second north pole is closer to the nanopore than the second south pole, or (b) the first south pole is closer to the nanopore than the first north pole, and the second south pole is closer to the nanopore than the second north pole.

In some aspects, at least one of the first magnetic component or the second magnetic component is a permanent magnet.

In some aspects, the system further includes an actuator coupled to the first magnetic component and/or the second magnetic component and configured to adjust a distance between the first magnetic component and the second magnetic component. In some aspects, the system further includes a processor coupled to the actuator and configured to execute one or more machine-executable instructions, that, when executed, cause the processor to control the actuator.

In some aspects, the at least one magnetic component includes an electromagnet. In some aspects, the at least one magnetic component further includes a permanent magnet. In some aspects, the system further includes a controller coupled to the electromagnet and configured to adjust a magnitude and/or direction of a current through the electromagnet. In some aspects, the electromagnet includes a core and a wire coil, wherein the core has a first shape and/or composition in a first region and a second shape and/or composition in a second region, wherein the first shape and/or composition differs from the second shape and/or composition. In some aspects, the at least one magnetic component further includes at least one magnetic shielding material situated around the electromagnet.

In some aspects, the paramagnetic solution includes a lanthanide element. In some aspects, the lanthanide element is gadolinium.

In some aspects, the at least one magnetic component includes a Halbach array, a magnetic wedge, a shimming magnet, or a magnetic flux concentrator.

In some aspects, the at least one magnetic component comprises a magnet with a sharp tip.

In some aspects, the techniques described herein relate to a system for controlling a translocation speed of a molecule through a nanopore, the system including: the nanopore; and at least one magnetic component situated to create a magnetic field that causes the molecule to experience a rotational torque as it passes through the nanopore.

In some aspects, the at least one magnetic component includes a first magnetic component situated on a first side of the nanopore and a second magnetic component situated on a second side of the nanopore, wherein the first magnetic component includes a north pole and the second magnetic component includes a south pole.

In some aspects, the system further includes an actuator coupled to the first magnetic component and/or the second magnetic component and configured to adjust a position of the first magnetic component and/or a position of the second magnetic component. In some aspects, an axis between the first magnetic component and the second magnetic component is at an angle to a translocation axis of the nanopore, and the actuator is further configured to adjust the angle.

In some aspects, at least one of the first magnetic component or the second magnetic component includes a permanent magnet.

In some aspects, an axis between the first magnetic component and the second magnetic component is at an angle to a translocation axis of the nanopore.

In some aspects, the system further includes an actuator coupled to the first magnetic component and/or the second magnetic component and configured to adjust the angle.

In some aspects, the system further includes an actuator configured to adjust a position of at least a portion the at least one magnetic component to adjust the rotational torque.

In some aspects, the nanopore is situated within a fluid chamber, and the system further includes a physical obstacle within the fluid chamber. In some aspects, the system further includes an actuator coupled to the at least one magnetic component and configured to adjust the rotational torque such that the molecule passing through the nanopore contacts the physical obstacle.

In some aspects, the at least one magnetic component includes a permanent magnet.

In some aspects, the at least one magnetic component includes an electromagnet.

In some aspects, the system further includes a controller coupled to the electromagnet and configured to adjust a magnitude and/or direction of a current through the electromagnet.

In some aspects, a characteristic of the at least one magnetic component is adjustable to allow an angle and/or strength of the rotational torque to be adjusted.

BRIEF DESCRIPTION OF THE DRAWINGS

Objects, features, and advantages of the disclosure will be readily apparent from the following description of certain embodiments taken in conjunction with the accompanying drawings in which.

Figure 1:
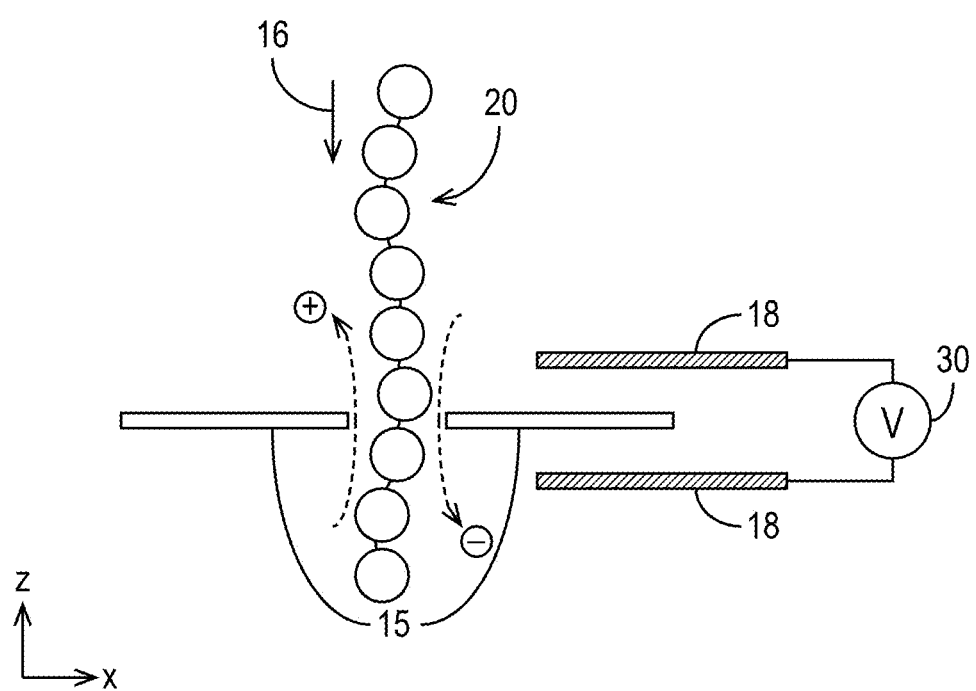
FIG. 1 illustrates a nanopore with a molecule passing through it.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

The inventors of the disclosures herein had the insight that magnetic fields and magnetic field gradients can be used to control the translocation speed of a molecule through a nanopore. For example, using a paramagnetic solution instead of a conventional electrolyte solution allows the translocation speed of a molecule passing through a nanopore to be controlled by creating a magnetic field gradient in the solution such that the molecule experiences resistance or drag, which slows its translocation. As will be appreciated by those having ordinary skill in the art, a magnetic field gradient refers to a change in the strength or direction of the magnetic field over a spatial distance. In effect, the disclosed approach provides a way to control the translocation speed that is independent of the voltage used for electrophoresis and current detection.

Accordingly, disclosed herein are speed-control devices, apparatuses, and systems that allow the translocation speeds of molecules through a nanopore to be controlled. In some embodiments, a magnetic field gradient is created in a paramagnetic fluid surrounding the nanopore, and, as a result, the molecule's translocation speed can be controlled and/or reduced. In effect, the disclosed approach allows a stable trap to be created in space using a magnetic field gradient. The strength and/or position of the trap can be adjusted by adjusting the distance between magnetic components and/or other of their characteristics (e.g., current through an electromagnet).

The inventors also had the insight that a magnetic field can be used to alter the path traveled by a molecule and to deliberately cause the molecule to be slowed by friction. For example, a magnetic field can be used to impose a rotational force on the molecule and thereby cause the molecule to come into contact with the sides of the nanopore and/or obstacles nearby. The amount of friction experienced by the molecule, and therefore its translocation speed, can be controlled by changing the amount of rotational torque imposed.

Thus, the disclosed embodiments provide a way to control the translocation speed that is independent of the voltage used for current measurements. As a result, the translocation speed can be controlled without compromising the SNR.

FIG. 1 illustrates a nanopore 15 with a molecule 20 (e.g., a single-stranded DNA (ssDNA) molecule), passing through it. The nanopore 15 has an associated translocation direction 16, which is along the z-axis shown in FIG. 1. FIG. 1 shows the translocation direction 16 as being toward the bottom of the page, but it is to be appreciated that it could also be in the opposite direction (toward the top of the page). Two sensing electrodes 18 (made from a suitable material, e.g.,  silver, platinum, etc.) are situated near the nanopore 15, on either side of it, to sense the ionic current through the nanopore 15. The sensing electrodes 18 are typically connected to a voltage source 30, which supplies a voltage to the sensing electrodes 18 and creates an electric potential across the nanopore 15. As explained above, as the molecule 20 passes through the nanopore 15, ions in the electrolyte solution are excluded from the hole in the nanopore 15, which causes changes in the ionic current and/or electronic signal measured across the nanopore 15 (e.g., using the sensing electrodes 18), which can be observed and used to detect constituent parts of the molecule 20 (e.g., nucleotides of a DNA strand). The sensing electrodes 18 may be coupled to detection circuitry (not illustrated) that detects the ionic current.

As explained above, a challenge with using a nanopore 15 for detection is that at the voltages that provide adequate SNR for reading the molecule 20, the translocation speed of molecule 20 through the nanopore 15 due to electrophoresis is too high (and the dwell time too low) to provide the desired resolution.

In the context of density-based diamagnetic separation, Winkleman et al. explain that the force per unit volume, $\vec{F}/V$, on a particle in a magnetic field is the sum of the gravitational force and the magnetic force, i.e., $$\vec{F}/V = (\rho_1 - \rho_p)\vec{g} - \frac{(\chi_1 - \chi_p)}{\mu_0}(\vec{B}\cdot\vec{\nabla})\vec{B}$$

where $\rho_1$ is the density of the liquid, $\rho_p$ is the density of the particle, $\vec{g}$ is the acceleration due to gravity, $\chi_1$ is the magnetic susceptibility of the liquid, $\chi_p$ is the magnetic susceptibility of the particle, $\mu_0$ is the magnetic permeability of free space, and $\vec{B}$ is the local magnetic field.

The inventors of the disclosures herein had the insight that similar principles could be applied in the context of nanopore detection. Specifically, if the difference between the magnetic susceptibilities of the solution and the molecule being detected were large enough, the translocation speed of a molecule through the nanopore 15 could be controlled by creating a magnetic field gradient in the solution. For example, if the solution is a paramagnetic solution, the magnetic susceptibility of the material used in the paramagnetic solution can be selected. Therefore, by choosing a suitable material for the paramagnetic solution and creating a magnetic field gradient, a desired force can be created to reduce the speed of a molecule translocating through a nanopore 15. As another example, the molecule itself could be naturally paramagnetic, or it could be made paramagnetic (e.g., by adding a magnetic complex to it). As long as the magnetic susceptibility of the molecule being detected is different enough from the magnetic susceptibility of the solution (e.g., such that one is affected substantially more than the other in the presence of a magnetic field), a magnetic field gradient can be used to create a desired force on the molecule to reduce its speed as it translates through the nanopore 15.

Some of the examples and discussion below presume that a paramagnetic solution is used to create the magnetic susceptibility differential described above. It is to be understood that, in addition or alternatively, the molecule being detected could be paramagnetic (naturally or made so). The disclosed embodiments are applicable to these variations.

Accordingly, in some embodiments, molecules translocating through a nanopore are in a paramagnetic solution, and a magnetic field gradient acts on the paramagnetic solution to create an additional force on a molecule to control its speed as it passes through a nanopore. In some embodiments, the magnetic field gradient, and therefore the amount of resistance the molecule experiences, can be optimized and/or controlled. For example, the magnetic field gradient can be created using at least one electromagnet, and the magnitude of the gradient can be adjusted by changing the magnitude of the current flowing through the electromagnet. As another example, the magnetic field gradient can be created using permanent magnets oriented with like poles facing each other (as discussed further below), in which case the magnitude of the magnetic field gradient can be adjusted by adjusting the distance between the permanent magnets. As yet another example, the magnetic field gradient can be adjusted by a magnet with a sharp tip situated near the location here the strongest gradient is to be applied.

The inventors had the additional insight that magnetic fields could be used to control translocation speed. Specifically, a magnetic field could be used to change the path traveled by a molecule to deliberately cause the molecule to be slowed by friction. For example, a magnetic field could be used to cause the molecule to come into contact with the sides of the nanopore and/or obstacles nearby. Therefore, in some embodiments, a molecule passing through a nanopore is subjected to a rotational torque created by at least one magnetic component. The rotational torque may cause the molecule to come into contact with the edges of the nanopore hole, thereby causing friction that slows the molecule's translocation through the nanopore. In some embodiments, at least one physical obstacle is situated near the hole in the nanopore, and the rotational torque causes a molecule passing through the hole to come into contact with the at least one physical obstacle, thereby causing friction that slows the molecule's translocation through the nanopore. In some such embodiments, the fluid surrounding the nanopore is conventional (e.g., does not include the paramagnetic additive described above).

Figure 2A:
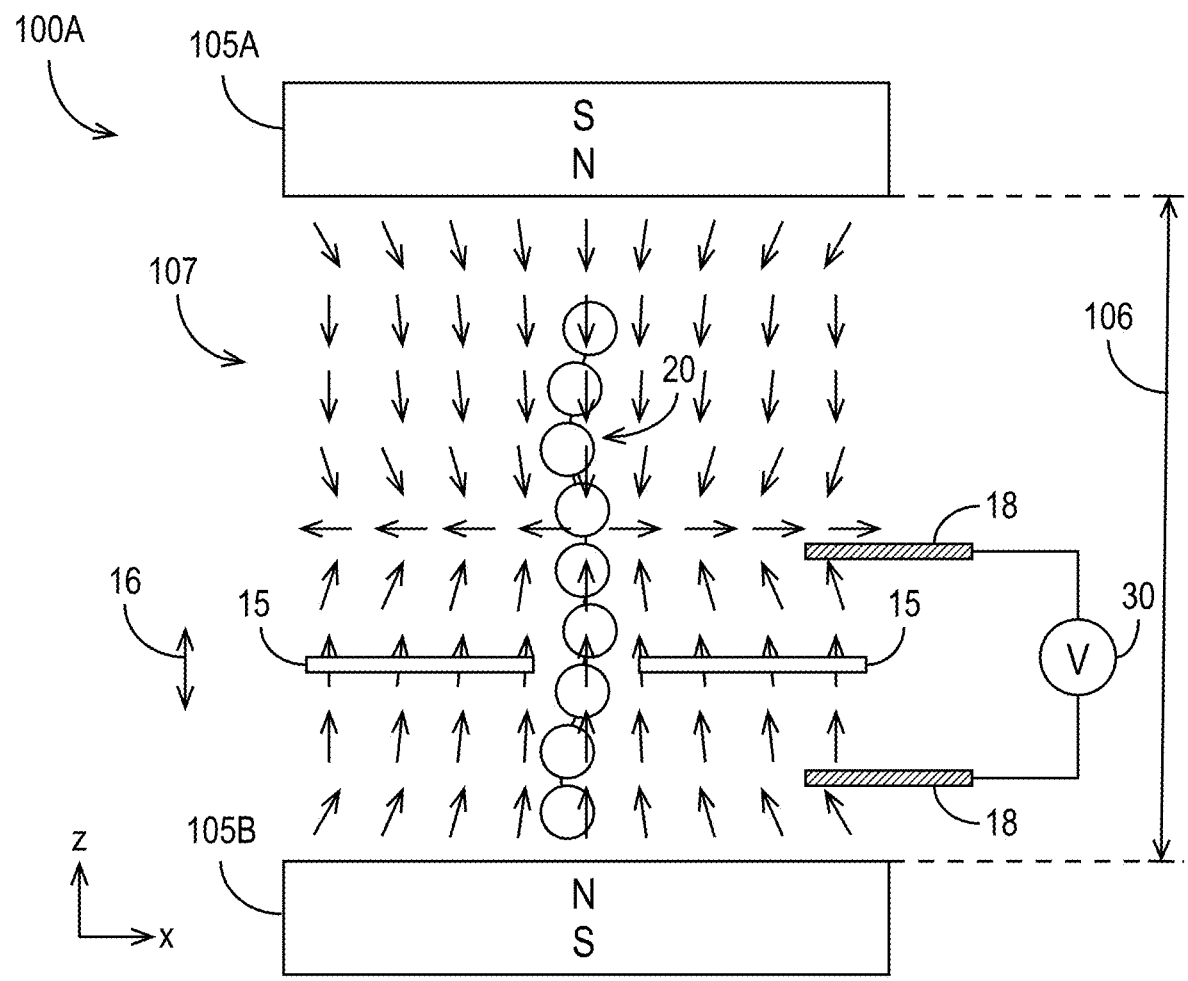
FIG. 2A illustrates an example of a system for controlling the translocation speed of a molecule through a nanopore in accordance with some embodiments.

FIG. 2A illustrates an example of a system 100A for controlling the translocation speed of a molecule 20 through a nanopore 15 in accordance with some embodiments. The system 100A includes a nanopore 15, a first magnetic component 105A, and a second magnetic component 105B. The nanopore 15 has a translocation direction 16, which is in the z-direction (positive or negative) of the axes shown in FIG. 2A. The system 100A also includes a voltage source 30 that is configured to apply an electric potential across the nanopore 15 (e.g., using the sensing electrodes 18). The voltage source 30 and sensing electrodes 18 may be used both to drive molecules through the nanopore 15 and also to detect changes in the ionic current through the nanopore 15.

The north and south poles of the first magnetic component 105A are substantially aligned with the translocation direction 16. Likewise, the north and south poles of the second magnetic component 105B are substantially aligned with the translocation direction 16. Stated another way, the first magnetic component 105A and second magnetic component 105B are not situated at angles to the nanopore 15. The first magnetic component 105A and the second magnetic component 105B can be equidistant from the nanopore 15, or, as in the example shown in FIG. 2A, one of the first magnetic component 105A or the second magnetic component 105B can be closer to the nanopore 15 than the other. The first magnetic component 105A and the second magnetic component 105B are separated from each other by a distance 106.

As shown in FIG. 2A, the first magnetic component 105A and the second magnetic component 105B are oriented so their like poles face each other. Stated another way, the north pole of the first magnetic component 105A is closer to the nanopore 15 than the south pole of the first magnetic component 105A is. Similarly, the north pole of the second magnetic component 105B is closer to the nanopore 15 than the south pole of the second magnetic component 105B is. In FIG. 2A, the north pole of the first magnetic component 105A faces the north pole of the second magnetic component 105B, but it is to be appreciated that the south pole of the first magnetic component 105A could alternatively face the south pole of the second magnetic component 105B.

The nanopore 15 is surrounded by (submerged in) a paramagnetic solution, which is an aqueous solution that has, in addition to ions (e.g., sodium), at least one paramagnetic material (e.g., ions, molecules, etc.) dissolved or dispersed within it. As will be understood by those having ordinary skill in the art, paramagnetic materials are weakly attracted to an external magnetic field. When a paramagnetic material is placed in a magnetic field, the material becomes magnetized in the same direction as the applied field. Once the external magnetic field is removed, the paramagnetic material loses its magnetism. Thus, when a paramagnetic solution is exposed to an external magnetic field, the paramagnetic material(s) within the fluid align themselves with the field, resulting in a weak attraction. The extent of the paramagnetic behavior depends on the concentration and nature of the paramagnetic material(s) in the fluid.

As a result of the like poles of the first magnetic component 105A and the second magnetic component 105B facing each other, a magnetic field gradient 107 (illustrated by an array of arrows) is created in the paramagnetic solution. The magnetic field gradient 107 exerts a translational (opposing) force on the molecule 20 passing through the nanopore 15. This translational force can be used to reduce the translocation speed of the molecule 20.

In some embodiments, the paramagnetic solution comprises a lanthanide element. As will be understood by those having ordinary skill in the art, lanthanide elements (sometimes referred to as rare earth elements) are the metallic chemical elements located in the periodic table within the lanthanide series. They include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Lanthanide elements are characterized by their similar electronic configurations, with the 4f orbitals progressively filling. Of the lanthanide elements, gadolinium, europium, terbium, dysprosium, holmium, erbium, and/or thulium may be particularly suitable for use in the disclosed paramagnetic solution. Elements with lower magnetic moments than gadolinium (e.g., cerium, praseodymium, neodymium) may also be suitable.

In some embodiments, the paramagnetic solution comprises gadolinium (Gd). As will be understood by those having ordinary skill in the art, gadolinium is a metal that exhibits paramagnetic properties (i.e., gadolinium is weakly attracted to magnetic fields). Gadolinium has a magnetic moment that depends on various factors. For example, the magnetic moment of gadolinium is dependent on temperature. At room temperature, the approximate magnetic moment of gadolinium is approximately 7.94 Bohr magnetons (µB). This value can change with temperature due to the Curie-Weiss law. As the temperature decreases, the magnetic moment increases due to increased alignment of the electron spins. At temperatures below the Curie temperature (around 20° C. for gadolinium), gadolinium becomes ferromagnetic, and its magnetic moment is significantly larger. Accordingly, in some embodiments, the temperature of the paramagnetic solution is kept above the Curie temperature.

The magnetic moment of gadolinium can also depend on other factors, including the presence of external magnetic fields, crystal structure, impurities, and alloying with other elements.

Although gadolinium has been identified by the inventors as a suitable paramagnetic material for use in the system, other materials having a positive magnetic susceptibility may be used instead or in addition. For example, as explained above, other of the lanthanide elements of the periodic table can be used instead of or in addition to gadolinium. The choice of paramagnetic material(s) may depend on a variety of factors, including magnetic susceptibility and/or cost. In determining the composition of the paramagnetic solution, it is desirable that the selected paramagnetic material(s)/element(s) remain suspended in the paramagnetic solution. In other words, the selected paramagnetic material(s)/element(s) should not settle or precipitate out.

Figure 2B:
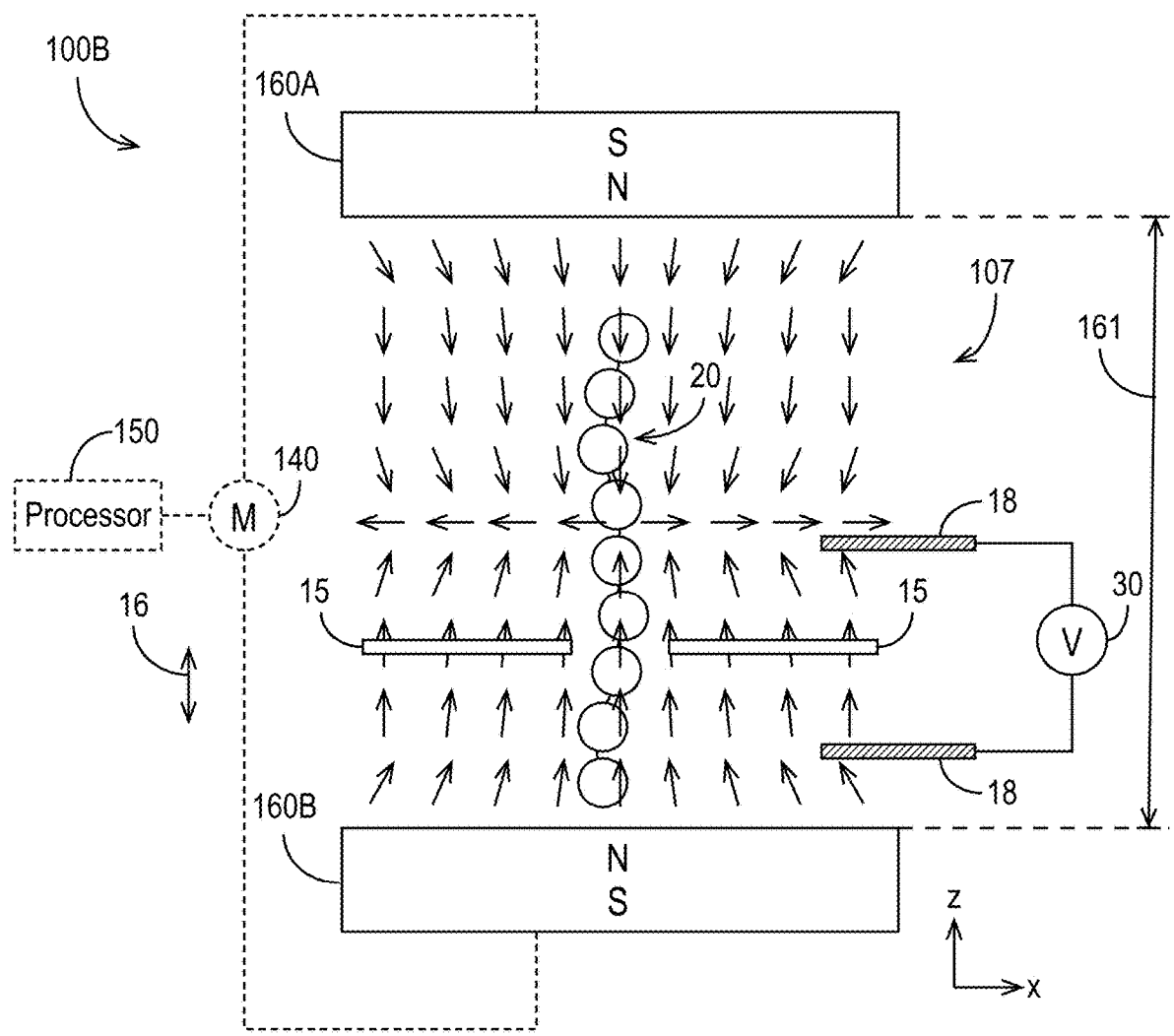
FIG. 2B illustrates another example of a system for controlling the translocation speed of a molecule through a nanopore in accordance with some embodiments.

FIG. 2B illustrates another example of a system 100B for controlling the translocation speed of a molecule 20 through a nanopore 15 in accordance with some embodiments. Like the system 100A, the system 100B includes magnetic components situated on either side of a nanopore 15. In the system 100B, a first magnetic component is a permanent magnet 160A, and a second magnetic component is a permanent magnet 160B. As shown in FIG. 2B, like poles of the permanent magnet 160A and the permanent magnet 160B face each other. FIG. 2B shows the north poles facing each other, but it is to be appreciated that, as explained above, the south poles could face each other instead.

Like the system 100A, the system 100B includes a nanopore 15, a voltage source 30, and sensing electrodes 18. These components were described above in the context of FIG. 2A. That description applies as well to FIG. 2B and is not repeated here.

As shown in FIG. 2B, the system 100B may optionally include an actuator 140. The actuator 140 may be coupled to both the permanent magnet 160A and the permanent magnet 160B, or it may be coupled to only one of them. If present, the actuator 140 may be used to adjust the distance 161 between the permanent magnet 160A and the permanent magnet 160B and thereby adjust the magnetic field gradient 107. For example, the actuator 140 can decrease the distance 161 to increase the magnetic field gradient 107, and increase the distance 161 to decrease the magnetic field gradient 107. If present, the actuator 140 may adjust the distance 161 during read operations to adjust the translocation speed of the molecule 20 as needed, on the fly.

As also shown in FIG. 2B, the system 100B may optionally include a processor 150, which may be coupled to the actuator 140. If present, the processor 150 may be configured to execute one or more machine-executable instructions that, when executed, cause the processor 150 to control the actuator 140. The processor 150 may be involved in measuring the ionic current through the nanopore 15, or the processor 150 may be able to obtain data about the translocation speed and/or detection process (e.g., an indication of SNR, signal quality, throughput, etc.). Based on this information, the processor 150 may be programmed to control the actuator 140 to adjust the distance 161 between the permanent magnet 160A and the permanent magnet 160B to adjust the magnetic field gradient 107. For example, if the processor 150 determines that the translocation speed is too high (e.g., the SNR is below a threshold), the processor 150 may control the actuator 140 to reduce the distance 161. As another example, if the processor 150 determines that the translocation speed could be increased (e.g., to improve throughput) without sacrificing SNR by more than an acceptable amount, the processor 150 may control the actuator 140 to increase the distance 161.

Although FIG. 2B shows the use of two permanent magnets, namely permanent magnet 160A and permanent magnet 160B, with like poles facing each other to create a magnetic field gradient, it is to be appreciated that a gradient can be created using other approaches. For example, a magnetic field gradient can be created using a plurality of permanent magnets by arranging the magnets in a specific configuration. As a specific example, permanent magnets arranged in a Halbach array (e.g., an arrangement of permanent magnets that produces a strong magnetic field on one side while minimizing the field on the other side) uses the magnetic properties of magnets to create a magnetic field gradient. By aligning the magnets in a specific pattern, such as alternating the orientation of each magnet, a magnetic field gradient can be created along a desired direction. As another example, magnetic wedges (which can also be referred to as tapered magnets because they have non-uniform thickness, tapering from one end to the other) can be used to create a magnetic field gradient. The varying thickness of magnetic wedges results in a changing magnetic field strength, creating a gradient along the length of the magnet. As another example, magnetic shimming (strategically placing additional magnets or magnetic materials around a main magnet to modify the magnetic field distribution) could be used. The strengths and placements of shimming magnets can be determined so as to shape the magnetic field and create a desired gradient. As yet another example, magnetic flux concentrators (e.g., iron or ferrite materials) can be used to guide and concentrate the magnetic field in specific regions, resulting in a gradient. Accordingly, it will be appreciated that there are many ways to create a magnetic field gradient using permanent magnets. The examples herein are not intended to be limiting. The selection of suitable magnets, their arrangement, their orientation, and other design details to create a desired magnetic field gradient are well within the ordinary level of skill in the art.

Figure 2C:
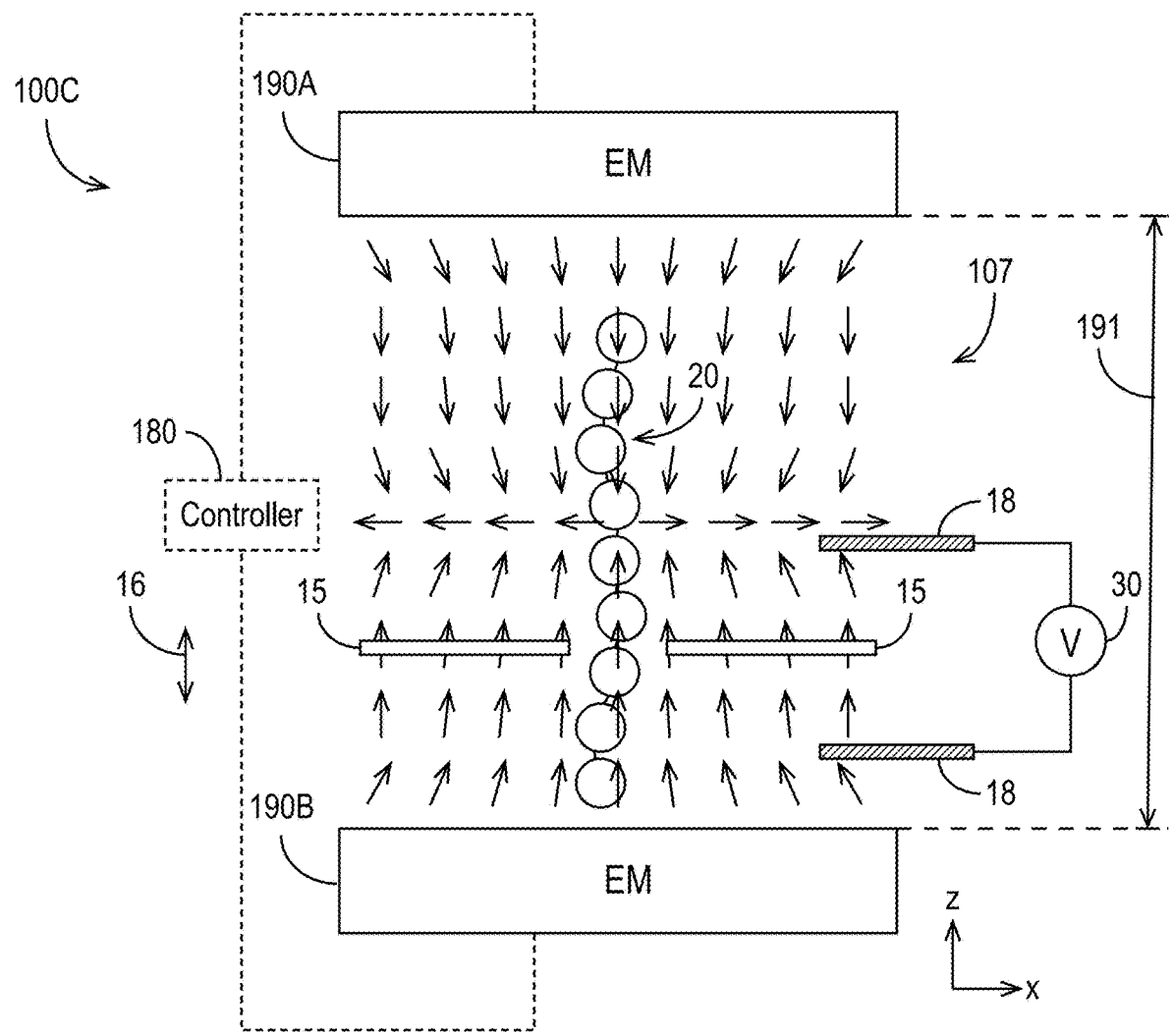
FIG. 2C illustrates another example of a system for controlling the translocation speed of a molecule through a nanopore in accordance with some embodiments.

FIG. 2C illustrates another example of a system 100C for controlling the translocation speed of a molecule 20 through a nanopore 15 in accordance with some embodiments. Like the system 100A and the system 100B, the system 100C includes a nanopore 15, a voltage source 30, and sensing electrodes 18. These components were described above in the context of FIG. 2A. That description applies as well to FIG. 2C and is not repeated here.

Like the system 100A and the system 100B, the system 100C includes magnetic components situated on either side of a nanopore 15. In the system 100C, a first magnetic component is an electromagnet 190A, and a second magnetic component is an electromagnet 190B. The electromagnet 190A and the electromagnet 190B can be structurally identical, or they can be different from each other. A desired magnetic field gradient in the region between the electromagnet 190A and the electromagnet 190B can be achieved by controlling the current (e.g., magnitude and direction) through the electromagnet 190A and/or the current (e.g., magnitude and direction) through the electromagnet 190B.

For example, by independently controlling the current flowing through the coils of at least one of the electromagnet 190A or the electromagnet 190B, specific magnetic field strengths can be created in different regions, leading to a gradient. Furthermore, the use of multiple coils with different current strengths or configurations can generate a magnetic field gradient.

The electromagnet 190A and the electromagnet 190B are separated by a distance 191. The distance 191 may be fixed, or it may be adjustable. The distance 191 may be selected during the design of the system 100C. The system 100C may include an actuator 140, as described above in the discussion of FIG. 2B, which, if present, may allow the distance 191 to be adjusted (e.g., by a processor 150, as described above, and/or by a controller 180, described below).

As also shown in FIG. 2C, the system 100C may optionally include a controller 180, which may be coupled to the electromagnet 190A and/or the electromagnet 190B. If present, the controller 180 may be configured to execute one or more machine-executable instructions that, when executed, cause the controller 180 to control the electromagnet 190A and/or the electromagnet 190B. The controller 180 may control the electromagnet 190A and/or the electromagnet 190B by, for example, setting or adjusting the magnitude and/or direction of current flowing through the coil(s) of the electromagnet 190A and/or electromagnet 190B. If present, the controller 180 may be used adjust the magnetic field gradient 107 during read operations to adjust the translocation speed of the molecule 20 as needed, on the fly.

As explained further below in the context of FIG. 2D, one of the electromagnet 190A or electromagnet 190B of FIG. 2C can be replaced by a permanent magnet (e.g., permanent magnet 160A or permanent magnet 160B from FIG. 2B), and the controller 180 can be used to adjust the current through whichever of the electromagnet 190A or electromagnet 190B remains part of the system 100C.

If present, the controller 180 may be involved in measuring or monitoring the ionic current through the nanopore 15, or the controller 180 may be able to obtain data about the translocation speed and/or detection process (e.g., SNR or a proxy for SNR, signal quality, throughput, etc.). Based on this information, the controller 180 may be programmed to control the current flowing through the coil(s) of the electromagnet 190A and/or electromagnet 190B to adjust the magnetic field gradient 107. For example, if the controller 180 determines that the translocation speed is too high (e.g., the SNR is below a threshold), the controller 180 may control the current(s) through the electromagnet 190A and/or electromagnet 190B to increase the magnetic field gradient 107. As another example, if the controller 180 determines that the translocation speed could be increased without sacrificing SNR by more than an acceptable amount, the controller 180 may control the electromagnet 190A and/or electromagnet 190B to decrease and/or modify the magnetic field gradient 107 (e.g., to increase throughput). As explained above, the system 100C may further include an actuator 140, as described in the discussion of FIG. 2B. If present, the actuator 140 may be coupled to the controller 180, which may be programmed to direct the actuator 140 to adjust the distance 191, thereby providing another way to adjust or set the magnetic field gradient 107, whether once or during operation (e.g., on the fly).

Although FIG. 2C illustrates a magnetic field gradient 107 created by two separate electromagnets, namely, electromagnet 190A and electromagnet 190B, it is to be appreciated that other ways to create a magnetic field gradient 107 can be used instead or in addition. For example, as explained above, one of the electromagnet 190A or electromagnet 190B could be replaced by a permanent magnet. As another example, a single electromagnet can be used to create a magnetic field gradient. For example, the density of the electromagnet's wire coil can be varied to create variations in magnetic field strength (e.g., winding the coil more tightly in some regions as compared to others to create a non-uniform magnetic field with a gradient). As another example, the shape, composition, and/or geometry of the ferromagnetic core of the electromagnet can be modified or designed to create a magnetic field gradient (e.g., using a core with different thicknesses or dimensions in different regions can result in variations in the magnetic field strength). As yet another example, magnetic shielding materials (e.g., ferromagnetic plates or sheets) can be strategically placed around an electromagnet to alter the magnetic field distribution and create a gradient. Accordingly, it will be appreciated that there are many ways to create a magnetic field gradient using electromagnets. The examples herein are not intended to be limiting. The selection of suitable electromagnets, their arrangement, their orientation, and other design details to create a desired magnetic field gradient are well within the ordinary level of skill in the art.

Although FIG. 2B illustrates a processor 150 and FIG. 2C illustrates as controller 180, it is to be understood that a processor 150 can be used instead of the controller 180 in FIG. 2C, and, similarly, that a controller 180 can be used instead of the processor 150 in FIG. 2B. As will be appreciated by those having ordinary skill in the art, processors and a controllers are electronic devices that perform computational tasks, and in many situations they can be used interchangeably. A processor is general-purpose computing device designed to handle a wide range of computational tasks, whereas a controller is a specialized device focused on controlling specific operations or systems. Processors may be characterized by their speed (clock frequency), number of cores, cache memory, and/or architectural features. Processors include, for example, digital signal processors. Controllers are typically designed to handle specific tasks or functions, often in real-time or embedded systems. Controllers typically include dedicated hardware, specialized software, and various input/output interfaces. Examples of controllers include microcontrollers, programmable logic controllers (PLCs), motor controllers, and flight controllers. The use of a processor 150 in some examples and a controller 180 in others is merely illustrative and is not intended to suggest that other components capable of providing the same functionalities could not be used instead or in addition.

Figure 2D:
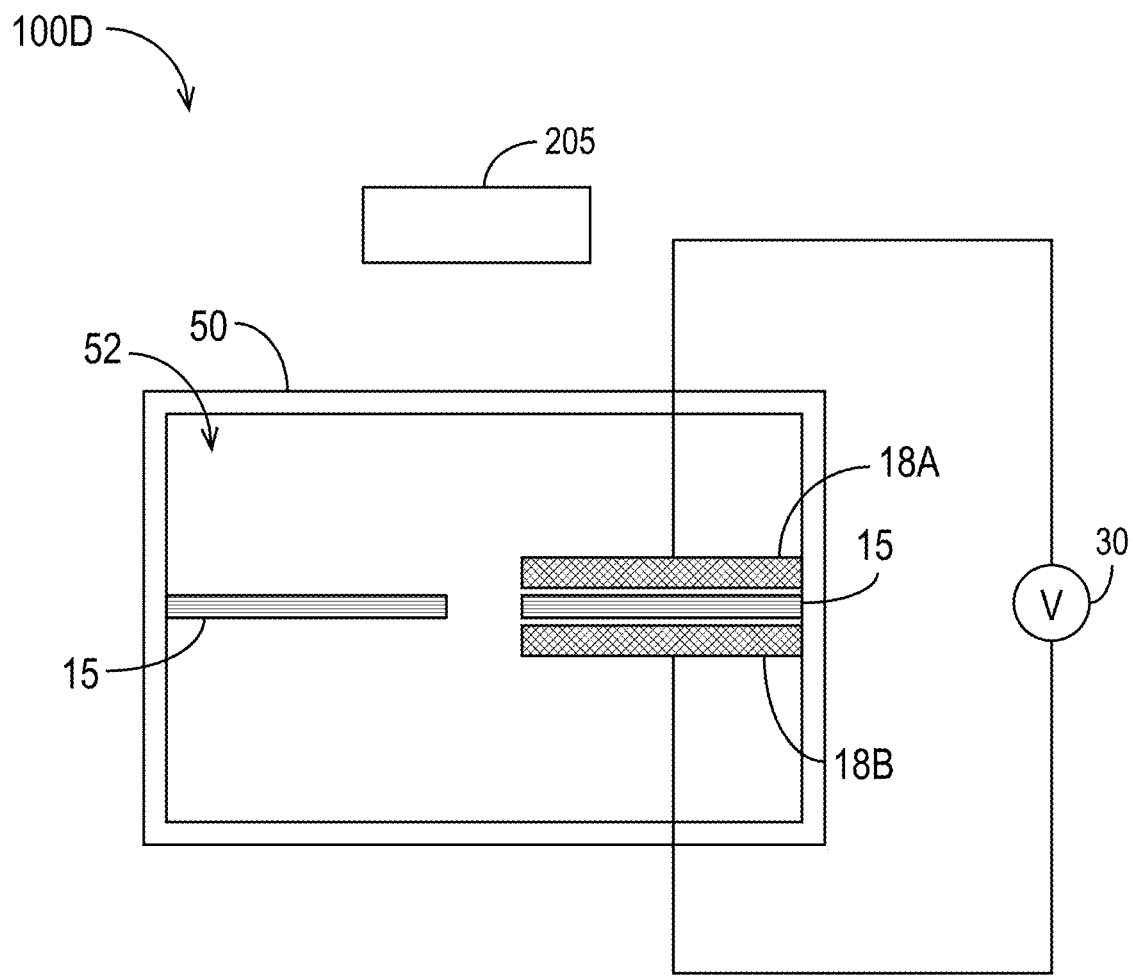
FIG. 2D illustrates another example of a system for controlling the translocation speed of a molecule through a nanopore in accordance with some embodiments.

FIG. 2D is a diagram of another system 100D for controlling the translocation speed of a molecule 20 through a nanopore 15 in accordance with some embodiments. The system 100D includes a nanopore unit 50, which has a fluid chamber 52 that can be filled with paramagnetic solution containing molecules to be detected (e.g., including the molecule 20). The nanopore unit 50 includes a nanopore 15. A first electrode 18A and second electrode 18B are situated on either side of the nanopore 15, as illustrated. The first electrode 18A and/or second electrode 18B may be in contact with the nanopore 15 or they may be separated from it. The voltage source 30 is configured to generate a voltage of sufficient magnitude across the first electrode 18A and second electrode 18B to drive molecules within the fluid chamber 52 through the nanopore 15 and to allow the effect of the molecules on the ionic current to be detected by a detection circuit coupled to the first electrode 18A and second electrode 18B. The voltage source 30 may be capable of providing a variable voltage level Vb across the first electrode 18A and second electrode 18B. The detection circuit may operate by, for example, detecting the resistance between the first electrode 18A and the second electrode 18B when the voltage is applied by the voltage source 30.

In operation, the voltage source 30 generates a voltage across the first electrode 18A and second electrode 18B, which causes an ionic or tunnel current, Is, to flow between the first electrode 18A and second electrode 18B and also causes molecules in the fluid chamber 52 to be drawn into the of the nanopore 15. If the voltage across the first electrode 18A and second electrode 18B is Vb, the current Is as given by Ohm's law is: Is=Vb/Rp, where Rp is the resistance through the nanopore 15 encountered by a molecule 20 as it passes through the hole.

As illustrated in FIG. 2D, the system 100D also includes at least one magnetic component 205, which is configured to create a magnetic field gradient 107 within the fluid chamber 52 to reduce the translocation speed of a molecule 20 through the nanopore 15. The at least one magnetic component 205 may be, for example, any of the structures in any of the configurations described above in the discussions of FIGS. 2A, 2B, and 2C, as well as variations, additions, or alternatives to those structures that can create a magnetic field gradient, some of which are described above. The at least one magnetic component 205 can include, for example, only permanent magnets, or only electromagnets, or a mix of permanent magnets and electromagnets. Although FIG. 2D illustrates the at least one magnetic component 205 as being external to the nanopore unit 50, some or all of the at least one magnetic component 205 may be situated within the fluid chamber 52. For example, if the at least one magnetic component 205 includes permanent magnets, those permanent magnets may be situated in the fluid chamber 52. If the at least one magnetic component 205 includes an electromagnet, the electromagnet may be situated outside of the fluid chamber 52. The enclosure of the nanopore unit 50 may be magnetically permeable so that magnetic fields can penetrate the enclosure to create a magnetic field gradient in the paramagnetic solution.

Multiple instantiations of the nanopore 15, the voltage source 30, and the at least one magnetic component 205 (whether partially or entirely inside of the fluid chamber 52 or partially or entirely outside of the fluid chamber 52) may be included in a single physical device, or they may be separate. Furthermore, in a physical device that includes more than one instantiation of the nanopore 15, the nanopore 15 may have a dedicated at least one magnetic component 205, or it may share the at least one magnetic component 205 with one or more other nanopores. For example, the at least one magnetic component 205 can be implemented as magnetic plates that act on multiple nanopore 15 at the same time. As another example, the at least one magnetic component 205 could comprise magnetic material situated on a surface of an array of nanopores 15 in combination with another magnetic component situated some distance from the magnetic material on the surface of the array.

Although FIG. 2D illustrates the at least one magnetic component 205 as being external to the nanopore unit 50 (e.g., not within the fluid chamber 52), that positioning is for convenience of illustration. Some or all of the at least one magnetic component 205 can be situated within the fluid chamber 52. For example, the at least one magnetic component 205 may comprise magnetic material deposited on either side of the nanopore 15.

Figure 2E:
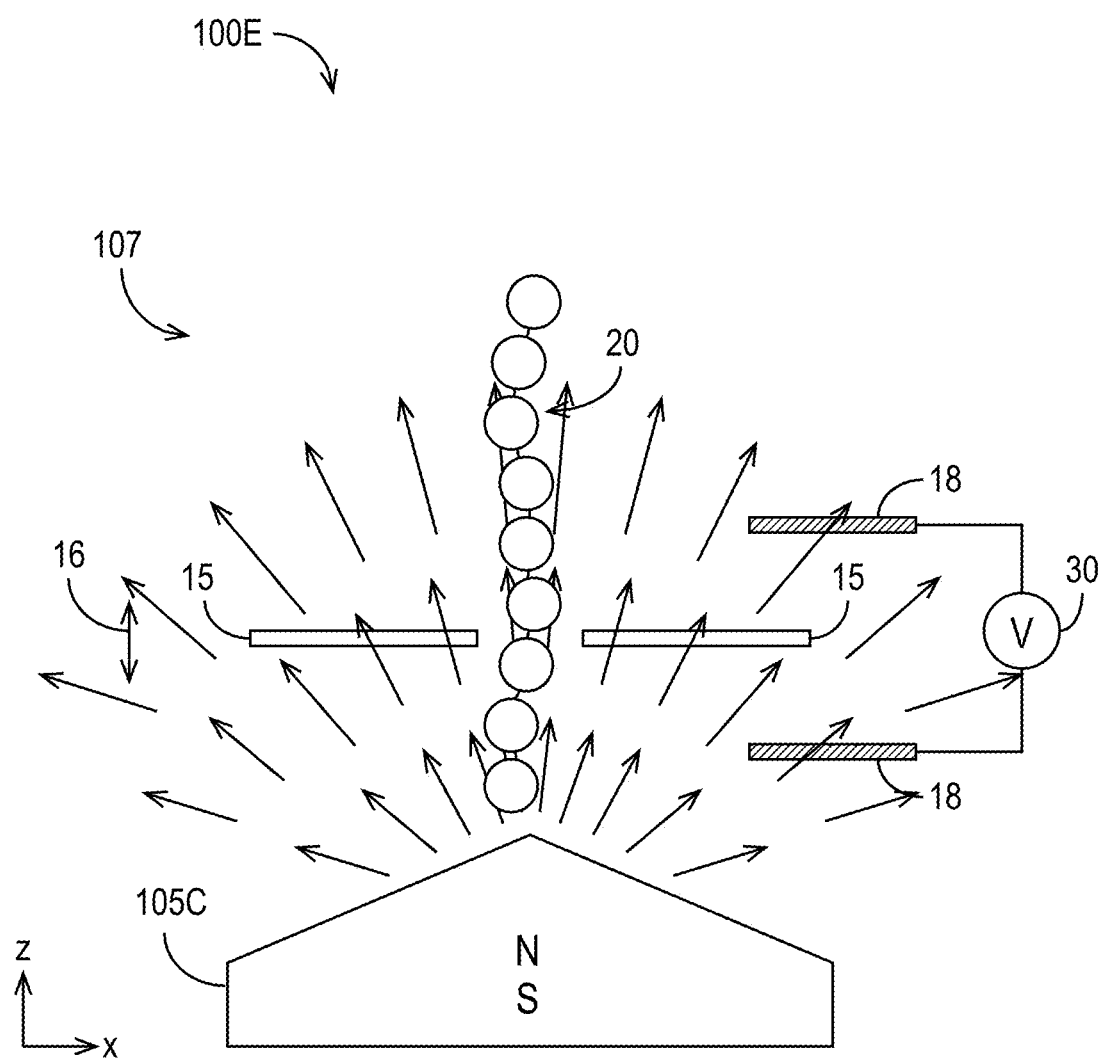
FIG. 2E illustrates another example of a system for controlling the translocation speed of a molecule through a nanopore in accordance with some embodiments.

FIG. 2E illustrates another example of a system 100E for controlling the translocation speed of a molecule 20 through a nanopore 15 in accordance with some embodiments. Like the system 100A, system 100B, system 100C, and system 100D, the system 100E includes a nanopore 15, a voltage source 30, and sensing electrodes 18. These components were described above in the context of FIG. 2A. That description applies as well to FIG. 2E and is not repeated here.

Unlike the system 100A, system 100B, system 100C, and system 100D described above, the system 100E includes a single magnetic component situated on one side of a nanopore 15. In the system 100E, the magnetic component is a permanent magnet 105C with a sharp tip. The effect of the permanent magnet 105C is to create a magnetic field gradient, as shown by the arrows in FIG. 2E.

In the examples described above in the discussions of FIGS. 2A, 2B, 2C, 2D, and 2E, a paramagnetic solution is used so that the speed of a molecule 20 translocating through a nanopore 15 can be adjusted/controlled independently of the voltage applied by the voltage source 30 for electrophoresis and for reading the current through the nanopore 15. (As explained above, alternatively or in addition, the molecule can be paramagnetic.) At least one magnetic component 205 is used to create a magnetic field gradient 107 in the vicinity of the nanopore 15, which causes the molecule 20 to be subjected to a translational force that reduces its translocation speed.

In addition to, or instead of, the use of a paramagnetic solution and/or a paramagnetic molecule, there are other approaches to controlling the translocation speed of a molecule 20 through a nanopore 15.

Figure 3A:
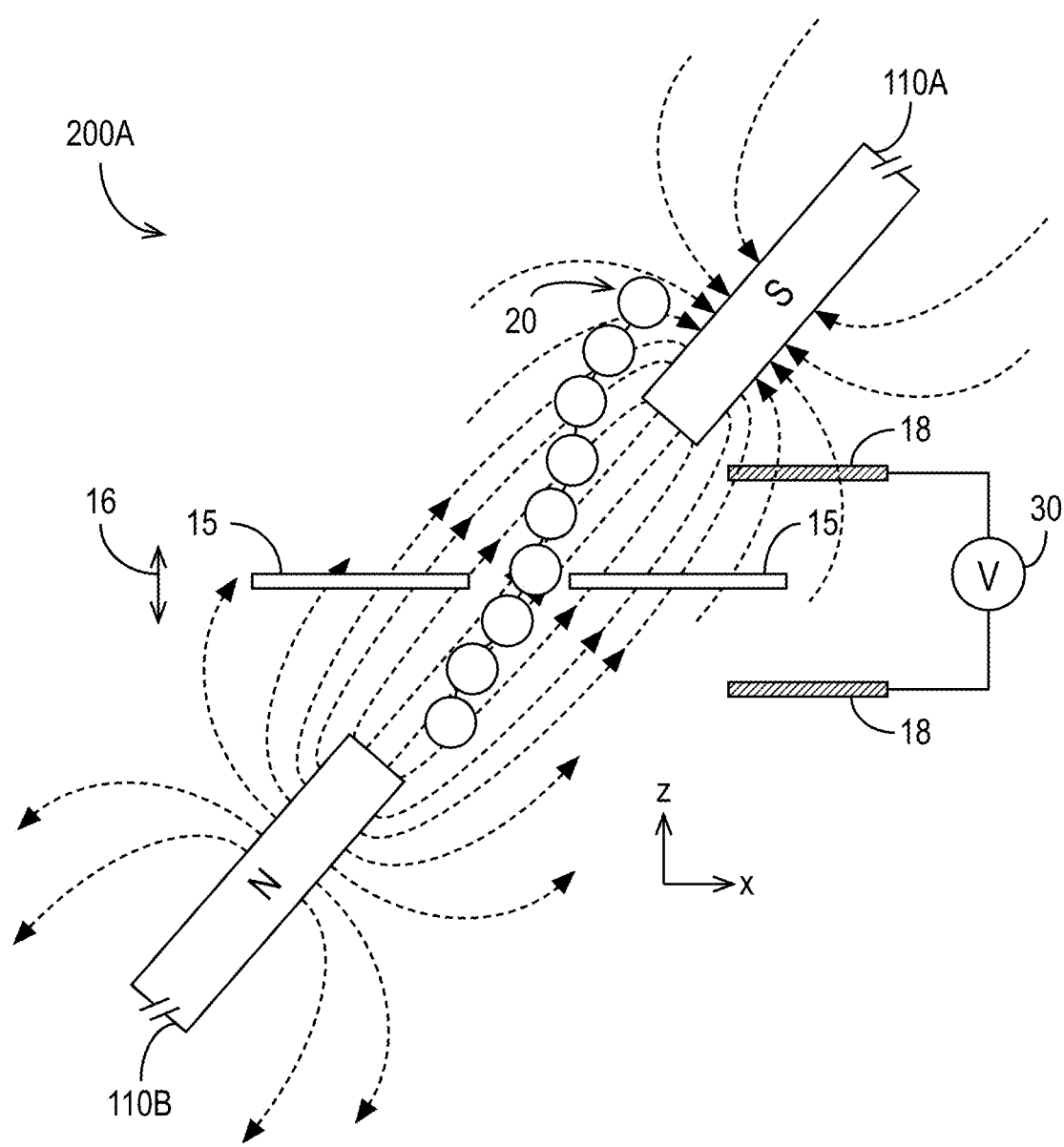
FIG. 3A illustrates another example of a system for controlling a translocation speed of a molecule through a nanopore in accordance with some embodiments.

FIG. 3A illustrates a system 200A for controlling a translocation speed of a molecule 20 through a nanopore 15 in accordance with some embodiments. The system 200A includes a nanopore 15, a voltage source 30, and sensing electrodes 18. These components were described above in the context of FIG. 2A. That description also applies to FIG. 3A and is not repeated here. The nanopore 15 has a translocation direction 16, which was described above in the discussion of FIG. 1 and FIG. 2A. That description also applies to FIG. 3A and is not repeated here.

As shown in FIG. 3A, the system 200A includes at least one magnetic component that is situated (positioned) so that, in operation, a molecule 20 passing through the nanopore 15 experiences a rotational torque caused by the at least one magnetic component. As a result of the rotational torque, the molecule 20 makes physical contact with a structure (e.g., the surface of the nanopore 15, a side of the hole in the nanopore 15, a physical obstacle, etc.), which causes friction and impedes the progress of the molecule 20 through the nanopore 15. The amount of friction can be dependent on the angle of rotation (e.g., such that larger angles result in higher friction). As a result, the at least one magnetic component allows the translocation speed to be controlled.

In the example shown in FIG. 3A, the at least one magnetic component includes a first magnetic component 110A and a second magnetic component 110B. In the example, the first magnetic component 110A comprises a south pole, and the second magnetic component 110B comprises a north pole, but it is to be appreciated that the first magnetic component 110A can comprise a north pole, and the second magnetic component 110B can comprise a south pole. Each of the first magnetic component 110A and second magnetic component 110B can comprise both a north pole and south pole, with the first magnetic component 110A and second magnetic component 110B are arranged so that their opposite poles are facing so that a magnetic field is established between the first magnetic component 110A and the second magnetic component 110B. In contrast to the examples described above in the context of FIGS. 2A, 2B, 2C, and 2D, in which a magnetic field gradient is created to cause a translational force that allows the translocation speed of the molecule 20 to be controlled, in FIG. 3A, a homogeneous magnetic field is created, but it is at an angle to the translocation direction 16, which causes the molecule 20 to come into contact with the nanopore 15 (e.g., its surface or a surface of the hole) and/or other physical objects (e.g., as discussed further below in the context of FIG. 3E).

In the example shown in FIG. 3A, the first magnetic component 110A is on a first side of the nanopore 15, and the second magnetic component 110B is on the other side of the nanopore 15. Specifically, in the illustrated example, the first magnetic component 110A is above the nanopore 15, and the second magnetic component 110B is below the nanopore 15. The first magnetic component 110A and the second magnetic component 110B can be equidistant from the nanopore 15, as in the example shown in FIG. 3A, or one of the first magnetic component 110A or second magnetic component 110B can be closer to the nanopore 15 than the other.

Figure 3B:
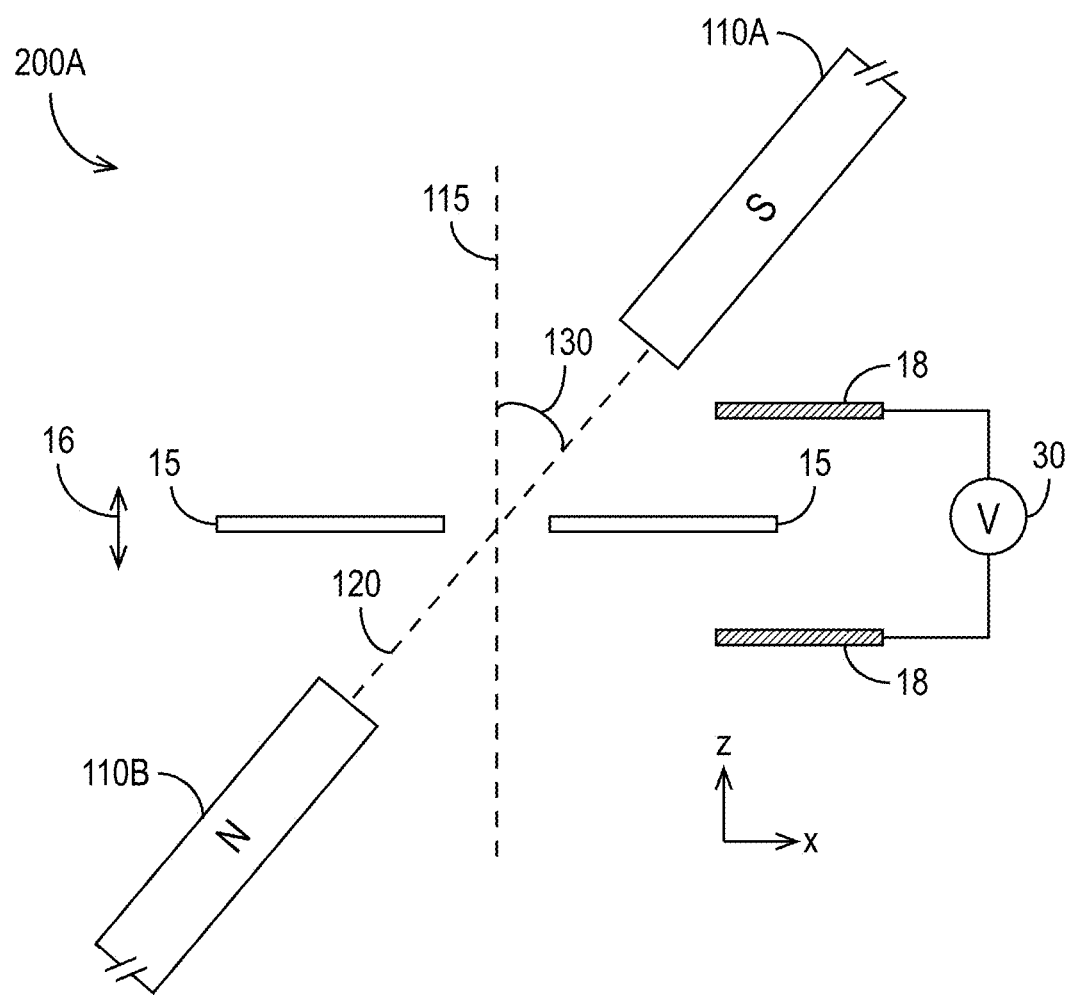
FIG. 3B illustrates another example of a system for controlling a translocation speed of a molecule through a nanopore in accordance with some embodiments.

FIG. 3A illustrates magnetic field lines of the substantially homogeneous electric field created by the first magnetic component 110A and the second magnetic component 110B. FIG. 3B illustrates the system 200A from FIG. 3A but with the magnetic field lines deleted. As shown in FIG. 3B, the first magnetic component 110A and second magnetic component 110B are arranged on (or connected by) an axis 120, which is a virtual axis. The axis 120 may, for example, connect the geometric center of the first magnetic component 110A to the geometric center of the second magnetic component 110B. The axis 120 is at an angle 130 to a translocation axis 115, which, as illustrated in FIG. 3B, is aligned with the translocation direction 16 (regardless of whether the molecule 20 moves in the positive or negative z-direction).

Figure 3C:
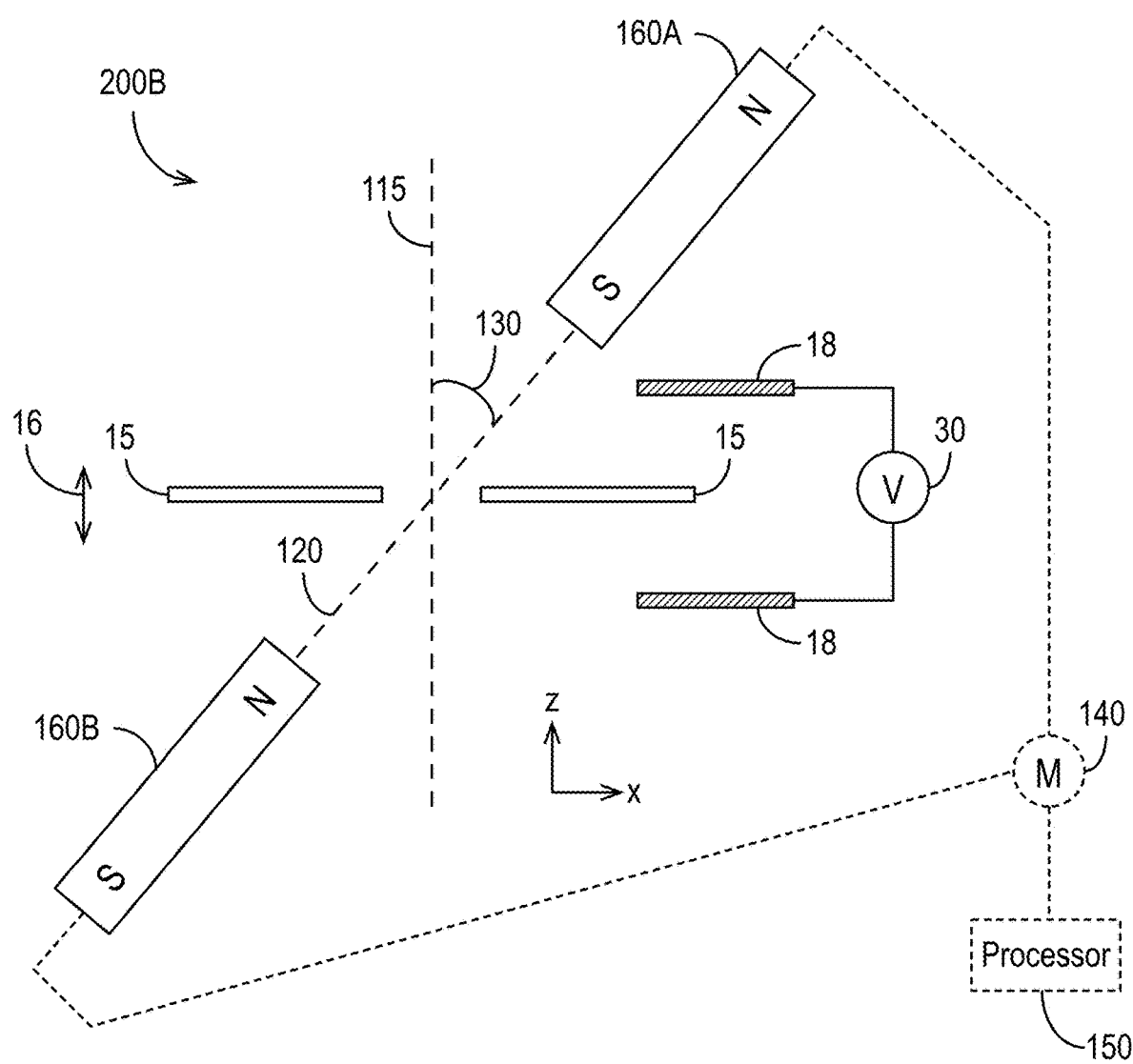
FIG. 3C illustrates another example of a system for controlling a translocation speed of a molecule through a nanopore in accordance with some embodiments.

FIG. 3C illustrates another example of a system 200B for controlling the translocation speed of a molecule 20 through a nanopore 15 in accordance with some embodiments. Like the system 200A, the system 200B includes at least one magnetic component. In the system 200B, a first magnetic component is a permanent magnet 160A, and a second magnetic component is a permanent magnet 160B. As shown in FIG. 3C, opposite poles of the permanent magnet 160A and the permanent magnet 160B face each other (in contrast to FIG. 2B, in which like poles are facing). FIG. 3C shows the south pole of the permanent magnet 160A facing the north pole of the permanent magnet 160B, but it is to be appreciated that the north pole of the permanent magnet 160A and the south pole of the permanent magnet 160B could face each other instead.

Like the system 200A, the system 200B includes a nanopore 15, a voltage source 30, and sensing electrodes 18. These components were described above in the context of FIG. 2A. That description applies as well to FIG. 3B and is not repeated here.

As shown in FIG. 3C, the system 200B may optionally include an actuator 140. The actuator 140 may be coupled to both the permanent magnet 160A and the permanent magnet 160B, or it may be coupled to only one of them. If present, the actuator 140 may be used to adjust the angle 130 and thereby adjust rotational torque applied to the molecule 20. For example, the actuator 140 can increase and/or decrease the angle 130. If present, the actuator 140 may adjust the angle 130 during read operations to adjust the translocation speed of the molecule 20 as needed, on the fly. It is to be appreciated that, if present, the actuator 140 could also, or alternatively, adjust the position(s) of the permanent magnet 160A and/or the permanent magnet 160B relative to the nanopore 15 (e.g., as described above in the discussion of FIG. 2B). For example, the actuator 140 could shift the permanent magnet 160B some amount in the z-direction and shift the permanent magnet 160A a corresponding amount such that the permanent magnet 160A and permanent magnet 160B are not equidistant from the nanopore 15.

As also shown in FIG. 3C, the system 200B may optionally include a processor 150, which may be coupled to the actuator 140. If present, the processor 150 may be configured to execute one or more machine-executable instructions that, when executed, cause the processor 150 to control the actuator 140. The processor 150 may be involved in measuring the ionic current through the nanopore 15, or the processor 150 may be able to obtain data about the translocation speed and/or detection process (e.g., SNR, a proxy for SNR, signal quality, throughput, etc.). Based on this information, the processor 150 may be programmed to control the actuator 140 adjust the angle 130 to adjust the rotational torque experienced by the molecule 20. For example, if the processor 150 determines that the translocation speed is too high (e.g., the SNR is below a threshold), the processor 150 may control the actuator 140 to increase the angle 130. As another example, if the processor 150 determines that the translocation speed could be increased without sacrificing SNR by more than an acceptable amount, the processor 150 may control the actuator 140 to decrease the angle 130 (e.g., to improve throughput). As explained above, the actuator 140 may be configured to control the distance between the permanent magnet 160A and the permanent magnet 160B, in which case the processor 150 can be programmed to direct the actuator 140 to adjust the distance.

Although FIG. 3C shows the use of two permanent magnets, namely permanent magnet 160A and permanent magnet 160B, with opposite poles facing each other to create a magnetic field, it is to be appreciated that a magnetic field can be created using other approaches. For example, additional permanent magnets may be used. As another example, electromagnets may be used (e.g., as described further below in the discussion of FIG. 3D). As yet another example, one of the permanent magnet 160A or the permanent magnet 160B could be replaced by an electromagnet. Accordingly, it will be appreciated that there are other ways to create a magnetic field. The examples herein are not intended to be limiting. The selection of suitable magnets and/or magnetic components, their arrangement, their orientation, and other design details to create a desired magnetic field are well within the ordinary level of skill in the art.

Figure 3D:
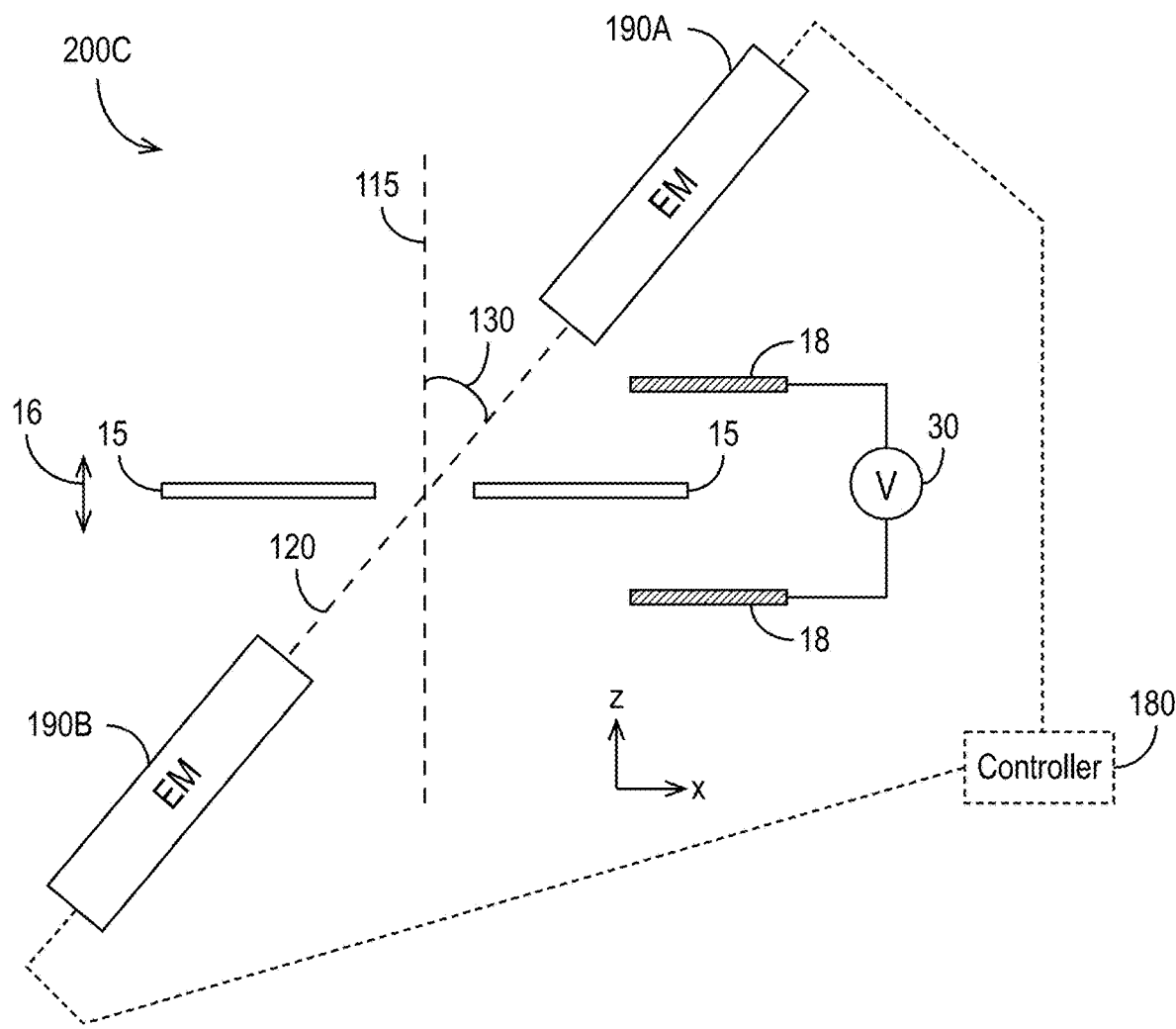
FIG. 3D illustrates another example of a system for controlling the translocation speed of a molecule through a nanopore in accordance with some embodiments.

FIG. 3D illustrates another example of a system 200C for controlling the translocation speed of a molecule 20 through a nanopore 15 in accordance with some embodiments. Like the system 200A and the system 200B, the system 200C includes a nanopore 15, a voltage source 30, and sensing electrodes 18. These components were described above in the context of FIG. 2A. That description applies as well to FIG. 3D and is not repeated here.

Like the system 200A and the system 200B, the system 200C includes at least one magnetic component (namely, magnetic components situated on either side of a nanopore 15). In the system 200C, a first magnetic component is an electromagnet 190A, and a second magnetic component is an electromagnet 190B. As shown in FIG. 3D, the electromagnet 190A and electromagnet 190B are arranged on (or connected by) an axis 120, which is a virtual axis. The axis 120 may, for example, connect the geometric center of the electromagnet 190A and the geometric center of the electromagnet 190B, or it may coincide with the shortest magnetic field line(s) between the electromagnet 190A and the electromagnet 190B. The axis 120 is at an angle 130 to a translocation axis 115, which, as illustrated in FIG. 3D, is aligned with the translocation direction 16.

The electromagnet 190A and the electromagnet 190B can be structurally identical, or they can be different from each other. A desired magnetic field in the region between the electromagnet 190A and the electromagnet 190B can be achieved by controlling the current (e.g., magnitude and direction) through the electromagnet 190A and/or the electromagnet 190B. For example, by independently controlling the current flowing through the coils of the electromagnet 190A and the electromagnet 190B, a desired magnetic field can be created. As explained above, the electromagnet 190A or the electromagnet 190B could be replaced by a permanent magnet.

As also shown in FIG. 3D, the system 200C may optionally include a controller 180, which may be coupled to the electromagnet 190A and/or the electromagnet 190B. If present, the controller 180 may be configured to execute one or more machine-executable instructions that, when executed, cause the controller 180 to control the electromagnet 190A, the electromagnet 190B, and/or the angle 130. The controller 180 may control the electromagnet 190A and/or the electromagnet 190B by, for example, setting or adjusting the magnitude and/or direction of current flowing through the coil(s) of the electromagnet 190A and/or the direction of current flowing through the coil(s) of the electromagnet 190B. If present, the controller 180 may be used adjust the magnetic field and/or the angle 130 during read operations to adjust the translocation speed of the molecule 20 as needed (e.g., on the fly).

If present, the controller 180 may be involved in measuring or monitoring the ionic current through the nanopore 15, or the controller 180 may be able to obtain data about the translocation speed and/or detection process (e.g., SNR, a proxy for SNR, signal quality, throughput, etc.). Based on this information, the controller 180 may be programmed to control the current flowing through the coil(s) of the electromagnet 190A and/or electromagnet 190B to adjust the magnetic field, and/or it may be programmed to change the angle 130. For example, if the controller 180 determines that the translocation speed is too high (e.g., the SNR is below a threshold), the controller 180 may increase the angle 130. As another example, if the controller 180 determines that the translocation speed could be increased without sacrificing SNR by more than an acceptable amount, the controller 180 may decrease the angle 130 (e.g., to increase throughput). As explained above, the system 200C may further include an actuator 140. If present, the actuator 140 may be coupled to the controller 180, which may be programmed to direct the actuator 140 to adjust the positions of the electromagnet 190A and/or electromagnet 190B.

Although FIG. 3D illustrates two separate electromagnets, namely, electromagnet 190A and electromagnet 190B, it is to be appreciated that other approaches can be used instead or in addition. For example, as explained above, one of the electromagnet 190A or the electromagnet 190B can be replaced by a permanent magnet. As another example, the electromagnet 190A and the electromagnet 190B can be two poles of the same electromagnet. Accordingly, it will be appreciated that there are many ways to create magnetic field at an angle to the translocation axis 115 and thereby apply a rotational torque to the molecule 20 as it translocates through the nanopore 15 as described herein. The examples herein are not intended to be limiting. The selection of suitable components, their arrangement, their orientation, and other design details to create a desired rotational torque to control the translocation speed of the molecule 20 are well within the ordinary level of skill in the art.

Although FIG. 3C illustrates a processor 150 and FIG. 3D illustrates as controller 180, it is to be understood that, as explained above, a processor 150 can be used instead of the controller 180 in FIG. 3D, and, similarly, that a controller 180 can be used instead of the processor 150 in FIG. 3C. The use of a processor 150 in some examples and a controller 180 in others is merely illustrative and is not intended to suggest that other components capable of providing the same functionalities could not be used instead or in addition.

Figure 3E:
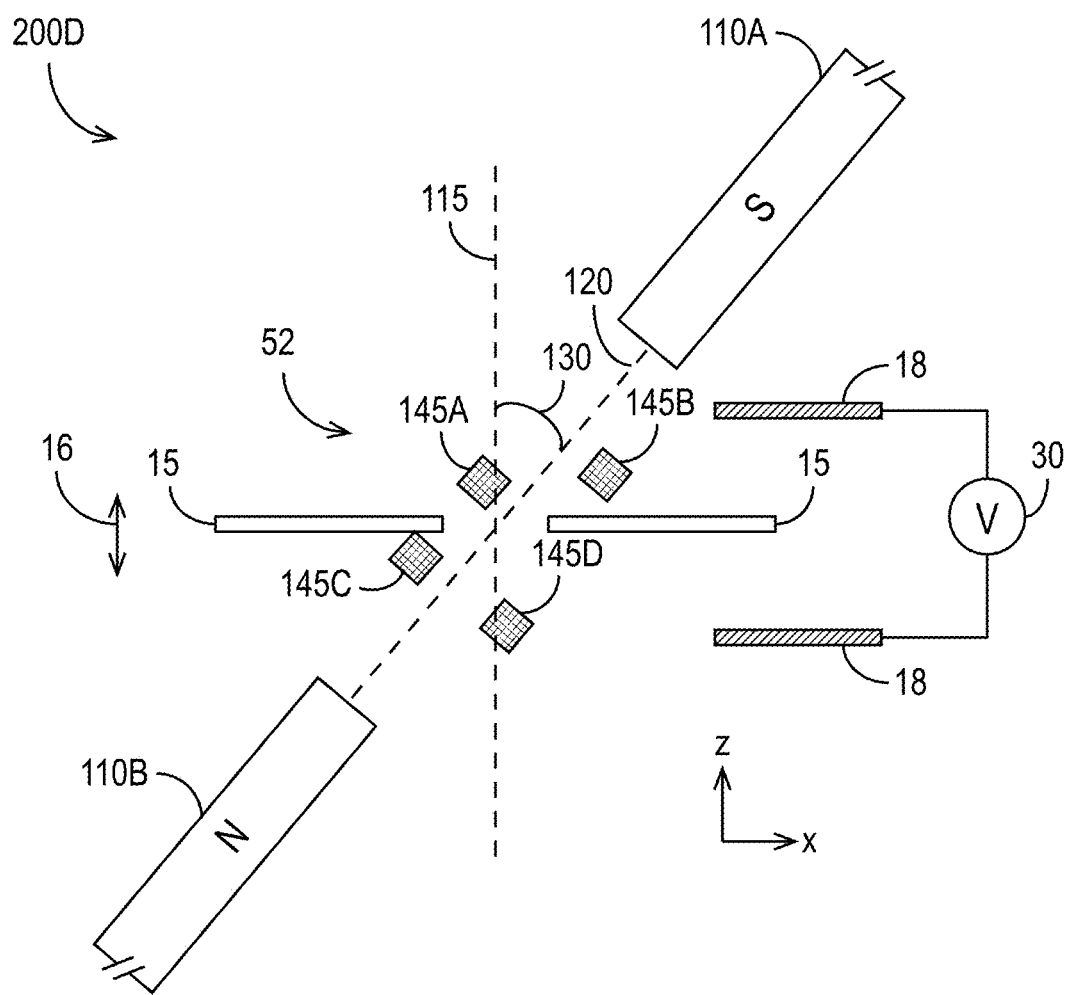
FIG. 3E illustrates an example of a system for controlling the translocation speed of a molecule through a nanopore that includes physical obstacles in the fluid chamber in accordance with some embodiments.

In some embodiments, one or more physical obstacles are included in the fluid chamber 52, and the rotational torque is adjusted so that a molecule 20 passing through the nanopore 15 comes into contact with the physical obstacle. FIG. 3E illustrates an example of a system 200D that includes physical obstacles in the fluid chamber 52 in accordance with some embodiments. Like the system 200A, the system 200B, and the system 200C, the system 200D includes a nanopore 15, a voltage source 30, and sensing electrodes 18. These components were described above in the context of FIG. 2A. That description applies as well to FIG. 3E and is not repeated here.

Like the system 200A, the system 200B, and the system 200C, the system 200D includes at least one magnetic component (namely, magnetic components situated on either side of a nanopore 15). In the system 200D, a first magnetic component 110A and a second magnetic component 110B are arranged on (or connected by) an axis 120, which is a virtual axis. The axis 120 may, for example, connect the geometric center of the first magnetic component 110A and the geometric center of the second magnetic component 110B, or it may correspond to the shortest of the magnetic field lines between the first magnetic component 110A and the second magnetic component 110B. The axis 120 is at an angle 130 to a translocation axis 115, which, as illustrated in FIG. 3E, is aligned with the translocation direction 16.

As shown in FIG. 3E, the system 200D includes one or more physical obstacles in the fluid chamber 52. In the example shown, the fluid chamber 52 includes the physical obstacle 145A, the physical obstacle 145B, the physical obstacle 145C, and the physical obstacle 145D. It is to be understood that the fluid chamber 52 can include more or fewer than four physical obstacles. The example of FIG. 3E, which includes four physical obstacles, is merely for illustrative purposes and is not intended to be limiting.

The physical obstacle 145A, physical obstacle 145B, physical obstacle 145C, and physical obstacle 145D may be provided to assist the first magnetic component 110A and the second magnetic component 110B to control the translocation speed of the molecule 20 through the nanopore 15. The physical obstacle 145A, physical obstacle 145B, physical obstacle 145C, and physical obstacle 145D may be included to provide additional friction points or surfaces for the molecule 20 as it translocates through the nanopore 15. As a result, the system 200D can provide finer control of the translocation speed of the molecule 20.

The number, positions, sizes, shapes, materials, etc. of the physical obstacles included in a system (e.g., physical obstacle 145A, physical obstacle 145B, physical obstacle 145C, and physical obstacle 145D of the system 200D) can be selected during the design process. For example, their positions may be selected so that a molecule 20 translocating through the nanopore 15 is more likely to contact different obstacles depending on the angle 130 in use. For example, referring to FIG. 3E, the positions, sizes, materials, etc. of the physical obstacle 145A, physical obstacle 145B, physical obstacle 145C, and physical obstacle 145D may be selected so that at large values of the angle 130, the molecule 20 comes into contact with many or all of the physical obstacle 145A, physical obstacle 145B, physical obstacle 145C, and physical obstacle 145D, whereas at smaller values of the angle 130, the molecule 20 comes into contact with fewer or none of the physical obstacle 145A, physical obstacle 145B, physical obstacle 145C, and physical obstacle 145D.

The number, sizes, shapes, material, positions, etc. of the physical obstacle 145A, physical obstacle 145B, physical obstacle 145C, and physical obstacle 145D can be determined during the design process based on a variety of considerations (e.g., type of molecule 20 being detected, voltage of the voltage source 30, strength of the magnetic field created by the first magnetic component 110A and the second magnetic component 110B, etc.). As stated above, the number of physical obstacles can be greater than or less than four.

It is to be appreciated that at least some aspects of the examples described above in the context of FIGS. 3A through 3E can be used in addition to those described in the context of FIGS. 2A through 2D. For example, the system 100A, system 100B, and/or system 100C can include physical obstacles (e.g., some or all of physical obstacle 145A, physical obstacle 145B, physical obstacle 145C, physical obstacle 145D, etc.) in the fluid chamber 52 as an additional way to control the translocation speed of the molecule 20 through the nanopore 15. It is also possible to apply a rotational torque to a molecule 20 as described in the discussion of FIGS. 3A through 3E and apply a translational force using a magnetic field gradient 107 as described in the discussion of FIGS. 2A through 2D. Thus, it will be appreciated that the disclosures in the context of FIGS. 2A through 2D can be used in conjunction with those in the context of FIGS. 3A through 3E.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A system for controlling a translocation speed of a molecule through a nanopore, the system comprising:
    a fluid chamber containing a solution having a magnetic susceptibility that is different from a magnetic susceptibility of the molecule;
    the nanopore situated in the fluid chamber; and
    at least one magnetic component configured to create a magnetic field gradient within the fluid chamber to control the translocation speed of the molecule through the nanopore,
    wherein (i) the solution is a paramagnetic solution, (ii) the molecule is paramagnetic, or (iii) both (i) and (ii).

2. The system recited in claim 1, wherein the at least one magnetic component comprises:
    a first magnetic component situated on a first side of the nanopore, the first magnetic component having a first north pole and a first south pole; and
    a second magnetic component situated on a second side of the nanopore, the second magnetic component having a second north pole and a second south pole;

wherein:
(a) the first north pole is closer to the nanopore than the first south pole, and the second north pole is closer to the nanopore than the second south pole, or
(b) the first south pole is closer to the nanopore than the first north pole, and the second south pole is closer to the nanopore than the second north pole.

3. The system recited in claim 2, wherein at least one of the first magnetic component or the second magnetic component comprises a permanent magnet.

4. The system recited in claim 3, further comprising an actuator coupled to the first magnetic component and/or the second magnetic component and configured to adjust a distance between the first magnetic component and the second magnetic component.

5. The system recited in claim 1, wherein the at least one magnetic component comprises an electromagnet.

6. The system recited in claim 5, wherein the at least one magnetic component further comprises a permanent magnet.

7. The system recited in claim 5, further comprising a controller coupled to the electromagnet and configured to adjust a magnitude and/or direction of a current through the electromagnet.

8. The system recited in claim 5, wherein the electromagnet comprises a core and a wire coil, wherein the core has a first shape and/or composition in a first region and a second shape and/or composition in a second region, wherein the first shape and/or composition differs from the second shape and/or composition.

9. The system recited in claim 5, wherein the at least one magnetic component further comprises at least one magnetic shielding material situated around the electromagnet.

10. The system recited in claim 1, wherein the solution comprises a lanthanide element.

11. The system recited in claim 10, wherein the lanthanide element is gadolinium.

12. A system for controlling a translocation speed of a molecule through a nanopore, the system comprising:
a fluid chamber containing a solution having a magnetic susceptibility that is different from a magnetic susceptibility of the molecule;
the nanopore situated in the fluid chamber; and
at least one magnetic component configured to create a magnetic field gradient within the fluid chamber to control the translocation speed of the molecule through the nanopore, wherein the at least one magnetic component comprises at least one of a Halbach array, a magnetic wedge, a shimming magnet, a magnet with a sharp tip, or a magnetic flux concentrator.

13. The system recited in claim 12, wherein the at least one magnetic component further comprises:
a first magnetic component situated on a first side of the nanopore, the first magnetic component having a first north pole and a first south pole; and
a second magnetic component situated on a second side of the nanopore, the second magnetic component having a second north pole and a second south pole;
wherein:
(a) the first north pole is closer to the nanopore than the first south pole, and the second north pole is closer to the nanopore than the second south pole, or
(b) the first south pole is closer to the nanopore than the first north pole, and the second south pole is closer to the nanopore than the second north pole.

14. The system recited in claim 12, wherein the at least one magnetic component further comprises an electromagnet.

15. A system for controlling a translocation speed of a molecule through a nanopore, the system comprising:
the nanopore; and
at least one magnetic component situated to create a magnetic field that causes the molecule to experience a rotational torque as it passes through the nanopore.

16. The system recited in claim 15, wherein the at least one magnetic component comprises a first magnetic component situated a first side of the nanopore and a second magnetic component situated on a second side of the nanopore, wherein the first magnetic component comprises a north pole and the second magnetic component comprises a south pole.

17. The system recited in claim 16, further comprising an actuator coupled to the first magnetic component and/or the second magnetic component and configured to adjust a position of the first magnetic component and/or a position of the second magnetic component.

18. The system recited in claim 17, wherein an axis between the first magnetic component and the second magnetic component is at an angle to a translocation axis of the nanopore, and wherein the actuator is further configured to adjust the angle.

19. The system recited in claim 16, wherein an axis between the first magnetic component and the second magnetic component is at an angle to a translocation axis of the nanopore, and further comprising an actuator coupled to the first magnetic component and/or the second magnetic component and configured to adjust the angle.

20. The system recited in claim 15, further comprising an actuator configured to adjust a position of at least a portion the at least one magnetic component to adjust the rotational torque.

21. The system recited in claim 15, wherein the nanopore is situated within a fluid chamber, and further comprising:
a physical obstacle within the fluid chamber.

22. The system recited in claim 21, further comprising:
an actuator coupled to the at least one magnetic component and configured to adjust the rotational torque such that the molecule passing through the nanopore contacts the physical obstacle.

23. The system recited in claim 15, wherein the at least one magnetic component comprises a permanent magnet or an electromagnet.

24. The system recited in claim 15, wherein the at least one magnetic component comprises an electromagnet, and further comprising a controller coupled to the electromagnet and configured to adjust a magnitude and/or direction of a current through the electromagnet.

25. The system recited in claim 15, wherein a characteristic of the at least one magnetic component is adjustable to allow an angle and/or strength of the rotational torque to be adjusted.

* * * * *